US012277665B2

(12) United States Patent
Lee et al.

(10) Patent No.: US 12,277,665 B2
(45) Date of Patent: *Apr. 15, 2025

(54) ELECTRONIC DEVICE FOR GENERATING IMAGE INCLUDING 3D AVATAR REFLECTING FACE MOTION THROUGH 3D AVATAR CORRESPONDING TO FACE AND METHOD OF OPERATING SAME

(71) Applicant: Samsung Electronics Co., Ltd., Suwon-si (KR)

(72) Inventors: Wooyong Lee, Suwon-si (KR); Yonggyoo Kim, Suwon-si (KR); Byunghyun Min, Suwon-si (KR); Dongil Son, Suwon-si (KR); Chanhee Yoon, Suwon-si (KR); Kihuk Lee, Suwon-si (KR); Cheolho Cheong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/452,883

(22) Filed: Aug. 21, 2023

(65) Prior Publication Data

US 2023/0394775 A1  Dec. 7, 2023

Related U.S. Application Data

(63) Continuation of application No. 17/194,837, filed on Mar. 8, 2021, now Pat. No. 11,798,246, which is a (Continued)

(30) Foreign Application Priority Data

Feb. 23, 2018  (KR) .................. 10-2018-0022262

(51) Int. Cl.
*G06V 10/00* (2022.01)
*G06T 11/00* (2006.01)
(Continued)

(52) U.S. Cl.
CPC ............ *G06T 19/20* (2013.01); *G06T 11/001* (2013.01); *G06T 13/40* (2013.01); *G06T 2207/30201* (2013.01)

(58) Field of Classification Search
CPC ......... G06T 19/20; G06T 13/40; G06T 15/02; G06T 11/001; G06T 2207/30201; G06V 40/168; G06V 40/20; G06V 20/653
See application file for complete search history.

(56) References Cited

U.S. PATENT DOCUMENTS 6,504,546 B1  1/2003 Cosatto et al.
6,735,566 B1  5/2004 Brand
(Continued)

FOREIGN PATENT DOCUMENTS

CN  104170358 A  11/2014
JP  2004-236186 A  8/2004
(Continued)

OTHER PUBLICATIONS

Korean Office Action dated Aug. 29, 2023, issued on Korean Application No. 10-2018-0022262.
(Continued)

*Primary Examiner* — Amir Alavi
(74) *Attorney, Agent, or Firm* — Jefferson IP Law, LLP

(57) ABSTRACT

An electronic device is provided. The electronic device includes a camera, a display, and a processor configured to obtain a first image including one or more external objects by using the camera, display to output a three-dimensional (3D) object generated based on attributes related to a face among the one or more external objects using the display,
(Continued)

receive a selection of at least one graphic attribute from a plurality of graphic attributes which can be applied to the 3D object, generate a 3D avatar for the face based on the at least one graphic attribute, and generate a second image including at least one object reflecting a predetermined facial expression or motion using the 3D avatar.

10 Claims, 21 Drawing Sheets

Related U.S. Application Data continuation of application No. 16/281,561, filed on Feb. 21, 2019, now Pat. No. 10,977,873.

(51) Int. Cl.
*G06T 13/40* (2011.01)
*G06T 19/20* (2011.01)

(56) References Cited

U.S. PATENT DOCUMENTS

| | | | |
|---|---|---|---|
| 6,807,290 B2 | 10/2004 | Liu et al. | |
| 6,919,892 B1 | 7/2005 | Cheiky et al. | |
| 6,925,438 B2 | 8/2005 | Mohamed et al. | |
| 7,027,054 B1 | 4/2006 | Cheiky et al. | |
| 7,643,685 B2 | 1/2010 | Miller | |
| 8,553,973 B2 | 10/2013 | Knothe et al. | |
| 8,555,164 B2 | 10/2013 | Huang et al. | |
| 8,634,658 B2 | 1/2014 | Onoe et al. | |
| 8,666,175 B2 | 3/2014 | Kim et al. | |
| 8,682,041 B2 | 3/2014 | Mccloskey | |
| 8,814,363 B2 | 8/2014 | Willis et al. | |
| 8,830,226 B2 | 9/2014 | Goossens | |
| 8,849,356 B2 * | 9/2014 | Chi | H04M 1/7243 455/566 |
| 8,922,553 B1 | 12/2014 | Tena et al. | |
| 9,457,266 B2 * | 10/2016 | Eck | A63F 13/92 |
| 9,786,084 B1 | 10/2017 | Bhat et al. | |
| 9,818,024 B2 | 11/2017 | Bacivarov et al. | |
| 9,892,561 B2 | 2/2018 | Choukroun et al. | |
| 9,927,967 B2 * | 3/2018 | Yu | G06F 3/0482 |
| 10,019,133 B1 * | 7/2018 | McNeill | H04L 51/56 |
| 10,165,949 B2 | 1/2019 | Tzvieli et al. | |
| 10,416,878 B2 * | 9/2019 | Ligh | G06F 3/04886 |
| 10,521,948 B2 | 12/2019 | Rickwald et al. | |
| 10,559,111 B2 | 2/2020 | Sachs et al. | |
| 10,565,790 B2 | 2/2020 | Kaehler | |
| 10,728,188 B2 * | 7/2020 | Park | H04L 51/52 |
| 10,965,800 B2 * | 3/2021 | Li | H04M 1/72412 |
| 10,977,873 B2 * | 4/2021 | Lee | G06T 11/001 |
| 11,226,735 B2 * | 1/2022 | Kwon | G06F 3/04883 |
| 11,625,145 B2 * | 4/2023 | Van Wiemeersch | G06F 3/0482 715/810 |
| 11,798,246 B2 * | 10/2023 | Lee | G06T 19/20 |
| 2002/0012454 A1 | 1/2002 | Liu et al. | |
| 2004/0207720 A1 | 10/2004 | Miyahara et al. | |
| 2008/0252716 A1 | 10/2008 | Kano et al. | |
| 2009/0215533 A1 | 8/2009 | Zalewski et al. | |
| 2011/0248992 A1 | 10/2011 | Van Os et al. | |
| 2012/0139920 A1 | 6/2012 | Kuwabara et al. | |
| 2012/0309520 A1 | 12/2012 | Evertt et al. | |
| 2013/0120425 A1 | 5/2013 | Kuwabara et al. | |
| 2013/0342527 A1 | 12/2013 | Molyneaux et al. | |
| 2014/0055554 A1 | 2/2014 | Du et al. | |
| 2015/0091815 A1 | 4/2015 | Michaelis | |
| 2015/0123967 A1 | 5/2015 | Quinn et al. | |
| 2015/0312523 A1 | 10/2015 | Li et al. | |
| 2016/0086387 A1 | 3/2016 | Os et al. | |
| 2017/0046065 A1 | 2/2017 | Zeng et al. | |
| 2017/0336943 A1 | 11/2017 | Chaudhri et al. | |
| 2018/0047200 A1 | 2/2018 | O'Hara et al. | |
| 2019/0266807 A1 | 8/2019 | Lee et al. | |
| 2019/0349476 A1 * | 11/2019 | Suri | H04M 1/72436 |

FOREIGN PATENT DOCUMENTS

| | | | |
|---|---|---|---|
| JP | 2008-263297 A | 10/2008 | |
| JP | 2011-515736 A | 5/2011 | |
| JP | WO2011155067 A1 | 8/2013 | |
| JP | 2015-118142 A | 6/2015 | |
| JP | 2015-531098 A | 10/2015 | |
| JP | 2018-514020 A | 5/2018 | |
| KR | 2002-0049504 A | 6/2002 | |
| KR | 10-2006-0082738 A | 7/2006 | |
| KR | 10-2012-0130627 A | 12/2012 | |
| KR | 10-2014-0049340 A | 4/2014 | |
| KR | 10-2016-0051536 A1 | 5/2016 | |
| KR | 10-2017-0002100 A | 1/2017 | |
| KR | 10-2017-0112406 A | 10/2017 | |
| KR | 10-2017-0134366 A | 12/2017 | |
| WO | 2009/133710 A1 | 11/2009 | |
| WO | 2011/155068 A1 | 12/2011 | |
| WO | 2013/097139 A1 | 7/2013 | |
| WO | 2013/152454 A1 | 10/2013 | |
| WO | 2015/065928 A1 | 5/2015 | |

OTHER PUBLICATIONS

Intel Software, "Scan and Merge Your Face Using Intel® RealSense™ Face Scanning Code Sample", https://www.youtube.com/watch?v=WEI9UgdGGCc, Mar. 2, 2016.
European Search Report dated Apr. 15, 2019, issued in European Patent Application No. 19159048.8.
Intenational Search Report dated May 29, 2019, issued in International Patent Application No. PCT/KR2019/002075.
Indian Office Action dated Jun. 1, 2022, issued in Indian Patent Application No. 202017036125.
Korean Office Action dated Jun. 14, 2022, issued in Korean Patent Application No. 10-2018-0022262.
Extended European Search Report dated Nov. 25, 2022, issued in European Patent Application No. 22190274.5.
Korean Office Action dated Feb. 20, 2023, issued in Korean Patent Application No. 10-2018-0022262.
Japanese Office Action dated Feb. 28, 2023, issued in Japanese Application No. 2019-030708.
Indian Hearing Notice dated Mar. 4, 2024, issued in Indian Application No. 202017036125.
Reconsideration Report by Examiner before Appeal dated Mar. 7, 2024, issued Japanese Application No. 2019-030708.
Chinese Office Action dated Jun. 14, 2024, issued in Chinese Application No. 201980014673.3.
Chinese Office Action dated Jan. 24, 2025, issued in Chinese Application No. issued in Chinese Application No. 201980014673.3.
Japanese Notice of Allowance dated Nov. 18, 2024, issued in Japanese Patent Application No. 2024-000538.
Korean Office Action dated Nov. 26, 2024, issued in Korean Patent Application No. 10-2024-0053639.

* cited by examiner

| CIRCUMSTANCE | EXPRESSION ATTRIBUTE SET 1 (EYES) | EXPRESSION ATTRIBUTE SET 2 (MOUTH) | ... |
|---|---|---|---|
| NORMAL | None | ∩ | ... |
| SMILE 1 | ○ ○ | ∪ | ... |
| SMILE 2 | ▯ ▯ | ‿ | ... |

FIG.13

| CIRCUMSTANCE | EXPRESSION ATTRIBUTE SET 1 (EYES) | EXPRESSION ATTRIBUTE SET 2 (EYES) | ... |
|---|---|---|---|
| GENERAL, DEFAULT, STANDBY | ∘ ∘ | ◉ ◉ | ... |
| INTERESTED, SURPRISED, OPEN EYES WIDE | ● ● | ● ● | ... |
| GLAD, FEEL GOOD, SMILE | ♡ ♡ | ⌒ ⌒ | ... |
| SLEEPY, INDIFFERENT, CLOSED EYES | — — | ╾ ╼ | ... |

FIG.14

| CIRCUMSTANCE | EXPRESSION ATTRIBUTE SET 1 | EXPRESSION ATTRIBUTE SET 2 | ... |
|---|---|---|---|
| GENERAL, DEFAULT, STANDBY |  |  | ... |
| GLAD, FEEL GOOD, SMILE |  |  | ... |
| SLEEPY, INDIFFERENT, CLOSED EYES | ... | ... | ... |

ELECTRONIC DEVICE FOR GENERATING IMAGE INCLUDING 3D AVATAR REFLECTING FACE MOTION THROUGH 3D AVATAR CORRESPONDING TO FACE AND METHOD OF OPERATING SAME

CROSS-REFERENCE TO RELATED APPLICATION(S)

This application is a continuation application of prior application Ser. No. 17/194,837, filed on Mar. 8, 2021, which is a continuation application of prior application Ser. No. 16/281,561, filed on Feb. 21, 2019, and is based on and claims priority under 35 U.S.C. § 119(a) of a Korean patent application number 10-2018-0022262, filed on Feb. 23, 2018, in the Korean Intellectual Property Office, the disclosure of which is incorporated by reference herein in its entirety.

BACKGROUND

1. Field

The disclosure relates to an electronic device for generating an image including a three-dimensional (3D) avatar reflecting the motion of a face through a 3D avatar of the face and a method of operating the same.

2. Description of Related Art

An electronic device may provide various services that use an avatar. The electronic device may use a 3D avatar of a user in order to display the user's emotion or intent in various applications.

The electronic device may provide a function of generating an avatar of the user and allow the user to create his/her own avatar.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a method for the same capable of providing a three-dimensional (3D) avatar based on a two-dimensional (2D) image including an object corresponding to a face.

According to various embodiments, an electronic device may generate and provide a 3D avatar of a user based on attributes related to a user's face.

According to various embodiments, an electronic device may generate and provide a 2D image including an object to which an avatar's facial expression, an avatar's gesture, a background, or an animation effect are variously applied using a 3D avatar generated based on a 2D image including a user.

Additional aspects will be set forth in part in the description which follows and, in part, will be apparent from the description, or may be learned by practice of the presented embodiments.

In accordance with an aspect of the disclosure, an electronic device is provided. The electronic device includes a camera, a display, and a processor configured to obtain a first image including one or more external objects by using the camera, display to output a three-dimensional (3D) object generated based on attributes related to a face among the one or more external objects using the display, generate a 3D avatar for the face based on at least one graphic attribute from among a plurality of graphic attributes which can be applied to the 3D object, and generate a second image including at least one object reflecting a predetermined facial expression or motion using the 3D avatar.

In accordance with another aspect of the disclosure, an electronic device is provided. The electronic device includes a camera, and a processor configured to obtain a first image including one or more external objects using the camera, identify a face included in the one or more external objects, select a three-dimensional (3D) avatar among one or more 3D avatars based on the face, generate a 3D object using the 3D avatar reflecting a facial expression corresponding to the face, and generate a second image including the 3D object.

In accordance with another aspect of the disclosure, an electronic device is provided. The electronic device includes a camera, and a processor configured to obtain a first image including one or more external objects by using the camera, determine whether a face is included in the one or more external objects, when the face is included in the one or more external objects, generate a three-dimensional (3D) avatar based on attributes corresponding to the face, and when the face is not included in the one or more external objects, block generating of a 3D avatar.

An electronic device, according to various embodiments, can provide a 3D avatar corresponding to an external object included in a 2D image obtained using a camera.

An electronic device, according to various embodiments, can provide a 2D image including an object generated using a 3D avatar reflecting a facial expression of the avatar, a gesture of the avatar, a background, or an animation effect.

An electronic device, according to various embodiments, can provide one or more applications using a 3D avatar generated based on a 2D image including a user's face.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 13 and 14 illustrate expression attributes related to a face according to various embodiments of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
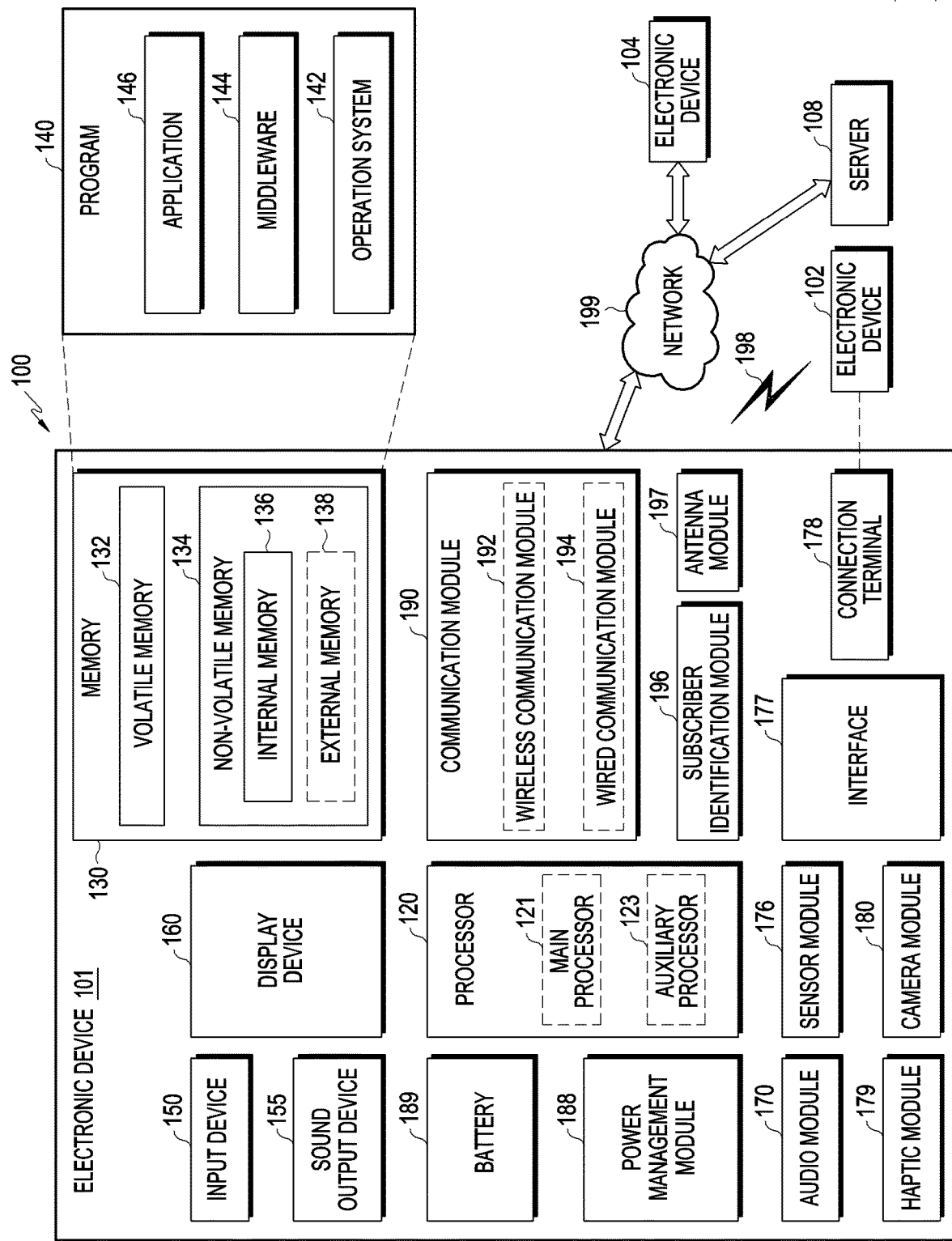
FIG. 1 is a block diagram illustrating an electronic device within a network environment according to various embodiments of the disclosure.

FIG. 1 is a block diagram illustrating an electronic device in a network environment according to various embodiments of the disclosure.

Referring to FIG. 1, the electronic device 101 in the network environment 100 may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134, which can include an internal memory 136 and an external memory 138. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the external electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
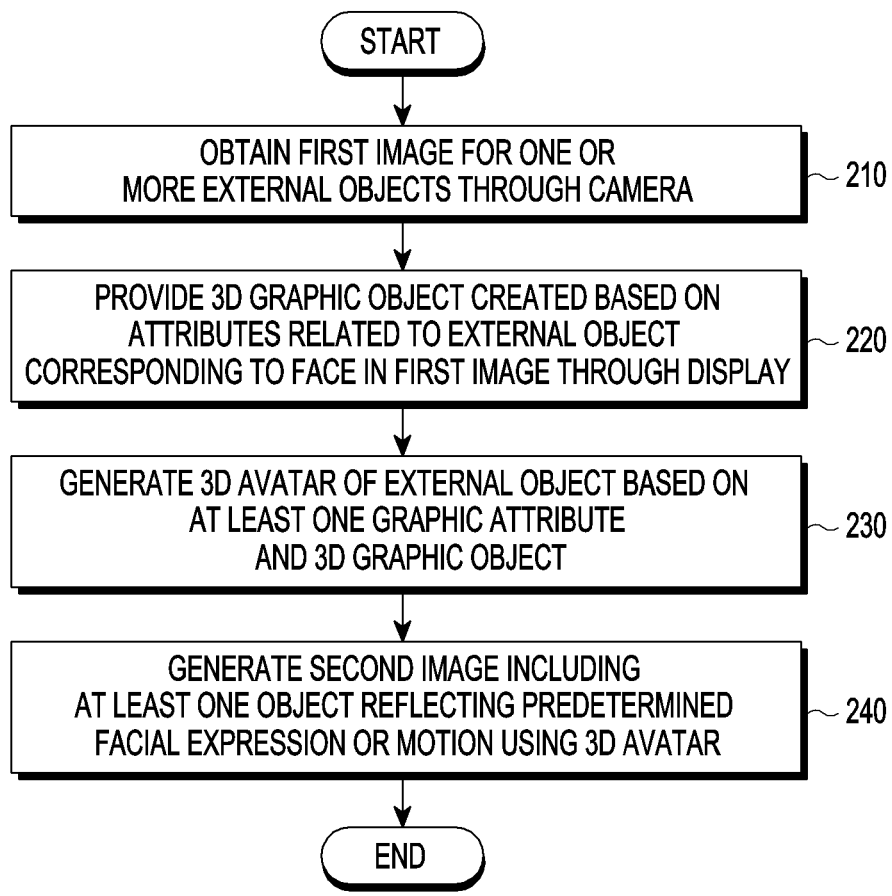
FIG. 2 is a flowchart illustrating a method of operating an electronic device which generates a three-dimensional (3D) avatar according to various embodiments of the disclosure.

FIG. 2 is a flowchart illustrating a method of operating an electronic device which generates a three-dimensional (3D) avatar according to various embodiments of the disclosure.

Referring to FIG. 2, according to various embodiments, an electronic device (for example, the electronic device 101 or the processor 120 of FIG. 1) may obtain a first image for one or more external objects through a camera (for example, the camera module 180 of FIG. 1) in operation 210. The electronic device 101 may obtain a two-dimensional (2D) image through a 2D camera module 180 and the first image may be a 2D image. The one or more external objects may include people, animals, or things. For example, the electronic device 101 may obtain a 2D image of a user's face. The electronic device 101 may detect an external object corresponding to a face in the first image obtained through the camera module 180. When no external object corresponding to the face is detected, the electronic device 101 may provide a message indicating that no face is detected. When no external object corresponding to the face is detected, the electronic device 101 may block (or skip) a process for generating a 3D avatar related to the first image.

In operation 220, the electronic device 101 may provide, through a display (for example, the display device 160 of FIG. 1), a 3D graphic object generated based on attributes related to the external object corresponding to the face. The attributes related to the external object may be defined for various characteristics related to the face. For example, the attributes related to the external object may include at least one of shapes of elements of the face (e.g., eyes, eyebrows, nose, cheekbones, lips, teeth, cheeks, chin, forehead, hair, facial hair (e.g., a mustache or a beard), dimples, ears, the back of the head, and a temple region), colors, the relative position between the elements, the relative size ratio between the elements, and accessories fixed to the head (for example, earrings, piercings, glasses, and nose rings). The electronic device 101 may generate a 3D graphic object by disposing at least one of the attributes related to an external object corresponding to the face on a 3D template for the face or head. The electronic device 101 may extract at least one of the attributes related to the external object to the face and apply the extracted attribute value to the 3D template to generate the 3D graphic object. The electronic device 101 may generate a 3D graphic object by applying at least one of attribute values for the length of the face, the width of the face, facial type, skin tone, the interval between eyes, the sizes of eyes, the existence or non-existence of a double eyelid, the color of eyebrows, nose length, nose position, lip size, lip position, cheekbone position, cheekbone size, and the existence or non-existence of a dimple in the external object to the 3D template. The electronic device 101 may generate a 3D graphic object using an attribute value (default value) designated to the 3D template. With respect to attributes related to hair or the back of the head, that is, attributes which are not extracted from the first image, the electronic device 101 may generate a 3D graphic object by directly applying the attribute value designated to the 3D template. The 3D graphic object may include all of the attribute values related to the face extracted from the obtained first image and the attribute value designated to the 3D template. The 3D template for the face or head may be stored in a database. The database may be included in a memory (for example, the memory 130 of FIG. 1) or a server (for example, the server 108 of FIG. 1). The electronic device 101 may generate one or more 3D graphic objects by changing at least one of the attributes related to the external object corresponding to the face and the 3D template. The electronic device 101 may display at least one of the one or more generated 3D graphic objects on the display device 160.

In operation 230, based on at least one attribute selected from a plurality of graphic attributes, which can be applied to the 3D graphic object and the 3D graphic object, the electronic device 101 may generate a 3D avatar for the external object. The plurality of graphic attributes which can be applied to the 3D graphic object may include brightness, color contrast, lip color, eyebrow color, mustache (beard), hairstyle, or accessories on a face (for example, glasses, a hat, earrings, and piercings). According to various embodiments, the plurality of graphic attributes which can be applied to the 3D graphic object may include motion parameters for face motions. The motion parameters may include the direction and size of the motion for each part of the face (for example, eyebrows, eyelids, a nose, and oral angle). The electronic device 101 may set motion parameter values based on the attributes related to the external object corresponding to the face. For example, the electronic device 101 may set the direction and size for an oral angle motion among the motion parameters based on the size or shape of a mouth extracted from the external object. The electronic device 101 may display at least one of the plurality of graphic attributes and the 3D graphic object together through the display device 160. The electronic device 101 may apply at least one graphic attribute selected according to user input from the plurality of graphic attributes to the 3D graphic object. The electronic device 101 may display, for example, the brightness of the plurality of graphic attributes on the display device 160, and when an input for the brightness is detected, may apply the detected input brightness value to the 3D graphic object. In response to a user input for the displayed graphic attributes among the plurality of graphic attributes, the electronic device 101 may display a preview for the 3D graphic object to which the input value is applied through the display device 160. The electronic device 101 may display attributes which can be applied to the 3D graphic object and receive input for the displayed attributes to provide a function of editing the 3D graphic object to the user. The electronic device 101 may generate a 3D avatar by applying at least one graphic attribute selected from the plurality of graphic attributes to the 3D graphic object. The electronic device 101 may generate a 3D avatar by applying at least one graphic attribute selected from the plurality of graphic attributes to the 3D graphic object and reprocessing the 3D graphic object. Through part of the operation for reprocessing the 3D graphic object, the electronic device 101 may delete unnecessary information from the 3D graphic object and make information which can be simplified brief to generate the 3D avatar. The 3D avatar may be stored in the memory (for example, the memory 130 of FIG. 1) or the server (for example, the server 108 of FIG. 1). When the 3D avatar is stored in the server (for example, the server 108 of FIG. 1), the electronic device 101 may provide the 3D avatar to the server (for example, the server 108 of FIG. 1) through the communication module 190. The 3D avatar may be stored in, for example, a gl Transmission Format (glTF).

In operation 240, the electronic device 101 may generate a second image including at least one object reflecting a predetermined facial expression or motion using a 3D avatar. For example, the electronic device 101 may display one or more predetermined facial expressions or motions in the 3D avatar. The electronic device may display one or more body gestures using the 3D avatar. For example, the electronic device 101 may detect a body shape (for example, detect a boundary line of a body image) and a motion of a person from an image (for example, a still image or a moving image) and generate an object reflecting the body shape and the motion (for example, generate skeleton information corresponding to the detected body shape and motion and reflect the skeleton information in a shape or a motion of each part of the body such that the object communicates a body gesture with a high similarity). The electronic device may display one or more background effects with the 3D avatar. The electronic device 101 may generate one or more objects based on a 3D avatar generated by applying a predetermined facial expression or motion to at least one of a facial expression, a body gesture, and a background effect and generate a 2D image based on the one or more objects. The electronic device 101 may generate the second image including one or more objects using the 3D avatar based on a predetermined number of facial expressions or motions. For example, based on a predetermined expression set, in which at least one of an avatar facial expression, an avatar gesture, a background, and an animation effect is changed, the electronic device 101 may reflect the predetermined expression set in the 3D avatar to generate objects corresponding to the predetermined number of expression sets. The second image including the generated objects may be an avatar character. The second image may be a 2D image including one or more objects. The electronic device 101 may store the second image in the form of a still image or a moving image. According to various embodiments, the electronic device 101 may generate the second image using a 3D avatar reflecting at least one of the avatar facial expression, the avatar gesture, the animation effect, and the background effect. The second image may be stored in the memory (for example, the memory 130 of FIG. 1) or the server (for example, the server 108 of FIG. 1). When the second image is stored in the server (for example, the server 108 of FIG. 1), the electronic device 101 may provide the second image to the server (for example, the server 108 of FIG. 1) through the communication module 190. The second image may be stored in, for example, a moving image file format (for example, mp4 or a gif). The electronic device 101 may provide various applications using the generated avatar characters. The electronic device 101 may provide the avatar characters through a keyboard application. For example, the electronic device 101 may provide a message sending application, a photo editing application, or a video call application using avatar characters included in the keyboard application. The avatar characters may be provided in other various applications.

FIGS. 3A, 3B, 3C, 3D, 3E, and 3F illustrate an example for an operation of generating a 3D avatar provided from the electronic device to a user according to various embodiments of the disclosure.

The electronic device 101 may generate a 3D avatar through a camera module (for example, the camera module 180 of FIG. 1). The electronic device 101 may execute the camera module 180 and provide an execution screen including an icon for generating a 3D avatar through a display (for example, the display device 160 of FIG. 1).

Figures 3A, 3B, 3C:
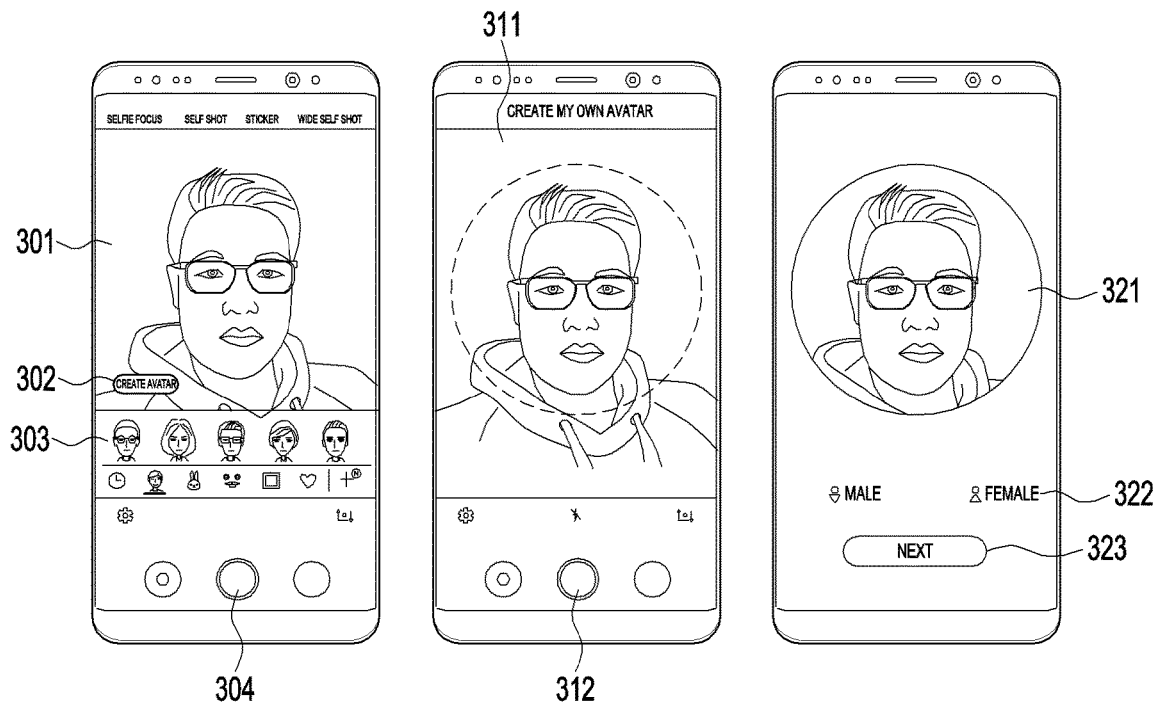
FIGS. 3A, 3B, 3C, 3D, 3E, and 3F illustrate an operation in which an electronic device generates a 3D avatar provided to a user according to various embodiments of the disclosure.

Referring to FIG. 3A, a preview screen area 301 for photographing an image, an icon 302 for creating a 3D avatar, a 3D avatar list 303, and an icon 304 for photography by a camera may be included. The electronic device 101 may display the icon 302 including text such as "create avatar". When the icon 302 for creating the avatar is selected, the electronic device 101 may obtain a user's facial image through the camera module 180.

Referring to FIG. 3B, the electronic device 101 may provide a preview screen area 311 for photographing an object including a face for which a 3D avatar will be generated and an icon 312 for camera photography. In order to obtain an image corresponding to various face angles or facial expressions in camera photography, guide information (for example, head orientation direction guide and emotion expression imitating guide) indicating a head orientation direction or facial expression may be further displayed. In camera photography, a plurality of photographed images through video photographing may be received.

Referring to FIG. 3C, the electronic device 101 may provide an area for displaying a photographed face image 321, an icon 322 for selecting a gender when an avatar is generated, and an icon 323 indicating selection completion. The electronic device 101 may generate one or more 3D graphic objects based on attributes related to the face in one or more photographed face images. The electronic device 101 may extract attributes related to the face from the face image and apply the attributes to a 3D template corresponding to the face to generate a realistic 3D graphic object. The electronic device 101 may extract attributes related to the face from the face image, change some of the extracted attributes, and apply the changed attributes to a 3D template corresponding to the face to generate a corrected 3D graphic object. The attributes related to the face may include at least one of shapes, the relative position between respective elements, the relative size ratio between respective elements, colors, and motion directions of face elements (e.g., eyes, eyebrows, nose, cheekbone, lips, teeth, cheek, chin, forehead, mustache (beard), dimples, and ears). The electronic device 101 may provide at least one of the one or more generated 3D graphic objects through the display device 160 and display a 3D graphic object selected from the at least one provided 3D graphic object on the screen.

Figures 3D, 3E, 3F:
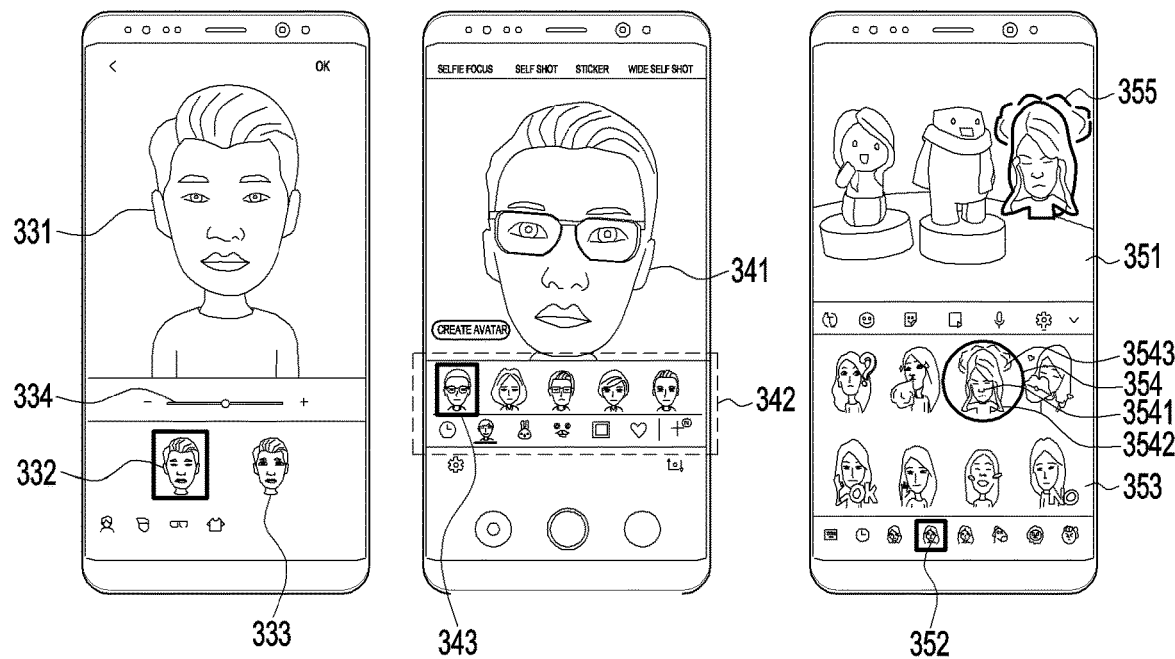

Referring to FIG. 3D, the electronic device 101 may provide one or more icons 332 and 333 corresponding to one or more 3D graphic objects and a preview area 331 for displaying a selected 3D graphic object. For example, the electronic device 101 may display an icon 332 corresponding to a first 3D graphic object and an icon 333 corresponding to a second 3D graphic object and display the selected first 3D graphic object 322 in the preview area 331. The electronic device 101 may extract attributes related to the face from the face image 321 and apply the extracted attribute value to a 3D template to generate the first 3D graphic object. The electronic device 101 may extract attributes related to the face from the face image 321, apply the extracted attribute value to a 3D template, and correct the 3D template according to a predetermined condition to generate the second 3D graphic object. According to an embodiment, during creation of a 3D graphic object, a 3D graphic object excluding a glasses attribute may be generated by not extracting or excluding an accessory (for example, glasses or earrings)-related attributes from the attributes related to the face. The electronic device 101 may use a default attribute value of the 3D template for attributes related to the face which are difficult to obtain from a 2D image. The electronic device 101 may provide at least one of a plurality of graphic attributes which can be applied to the 3D graphic object together with the 3D graphic object. The electronic device 101 may provide a selection bar 334 for controlling skin tone attributes of the 3D graphic object. The electronic device may control the skin tone to be dark according to an input for moving the selection bar 334 to the side of (−) and control the skin tone to be light according to an input for moving the selection bar 334 to the side of (+). The electronic device 101 may provide a preview in the preview area 331 by applying the input skin tone value to the 3D graphic object in response to the input. According to an embodiment, an initial position of the selection bar 334 may be determined based on the attributes (for example, color and brightness) of the face area extracted from the image 311 received through camera module 180 of the electronic device 101. To this end, an additional operation for determining the attributes of the face area may be performed. For example, during photography by the camera module 180 using an illumination sensor included in the sensor module 176 of, the electronic device 101 may measure the illumination of ambient light and correct the attributes of the extracted face area based on the measured illumination.

Referring to FIG. 3E, the electronic device 101 may generate a 3D avatar of a user's face based on graphic attributes that are selected according to user input and a 3D graphic object. The electronic device 101 may display a generated 3D avatar 341 in the preview area. The electronic device 101 may provide an avatar list area 342 for displaying one or more 3D avatars. The electronic device 101 may add an icon 343 corresponding to the generated 3D avatar 341 and display the same in the avatar list area 342. The electronic device 101 may generate a 2D image including at least one object reflecting a predetermined facial expression or motion through a 3D avatar. For example, the electronic device 101 may generate an object based on a 3D avatar to which a smile is applied and generate a 2D image including the object. For example, it is possible to generate the object included in the 3D avatar by adding an accessory icon to the avatar list area 342 based on accessory attributes that are pre-extracted from the 3D avatar and selecting the accessory icon. The electronic device 101 may provide a function of inputting an avatar character through the 2D image. For example, the electronic device 101 may provide a photo edit including a function of inputting an avatar character. According to various embodiments, the electronic device 101 may add an object selected from at least one object included in the 2D image to the photo when editing the photo, and provide a function of editing the photo by controlling the position, size, or direction of the added object.

Referring to FIG. 3F, the electronic device 101 may display an area 351 for displaying a photo to be edited, an icon 352 for providing a function of inputting an avatar character, and an area 353 for displaying one or more objects included in the selected avatar character on the screen for the photo edit. The one or more objects included in the avatar character may include at least one of a facial expression of the avatar, a gesture of the avatar, a background image, and an animation effect. The electronic device 101 may add a photo for editing a first object 354 selected from one or more objects included in the selected avatar and display the same in the area 351 for displaying the photo including the object 355. The first object 354 may include a frown 3541, a gesture 3542 of covering the face with both hands, and an overhead cloud background 3543. The electronic device 101 may change the position, size, or direction of the object 355 to be edited according to user input.

Figure 4A:
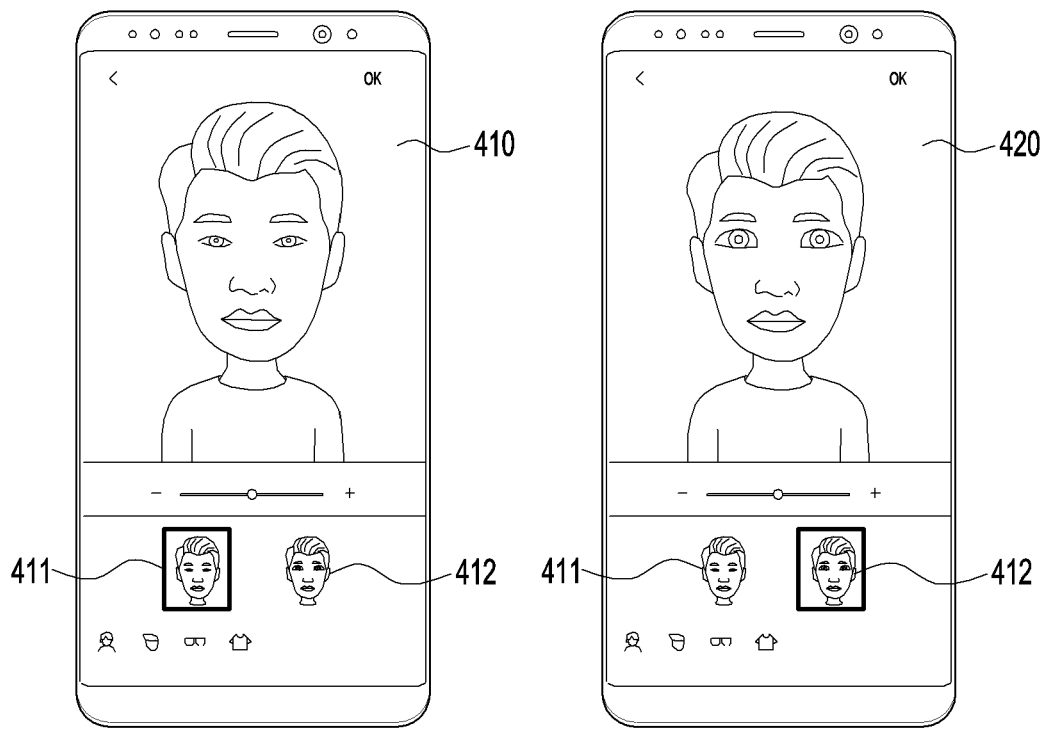
FIGS. 4A, 4B, and 4C illustrate a 3D graphic object generated by an electronic device and graphic attributes which can be applied to the 3D graphic object according to various embodiments of the disclosure.
Figure 4B:
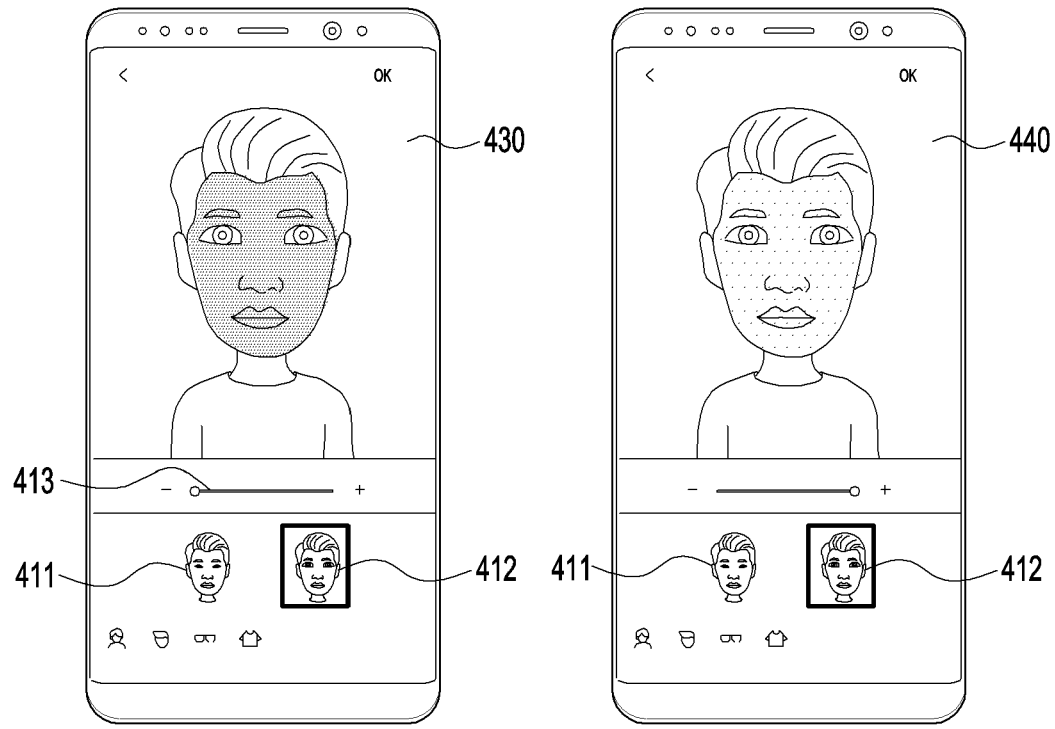
Figure 4C:
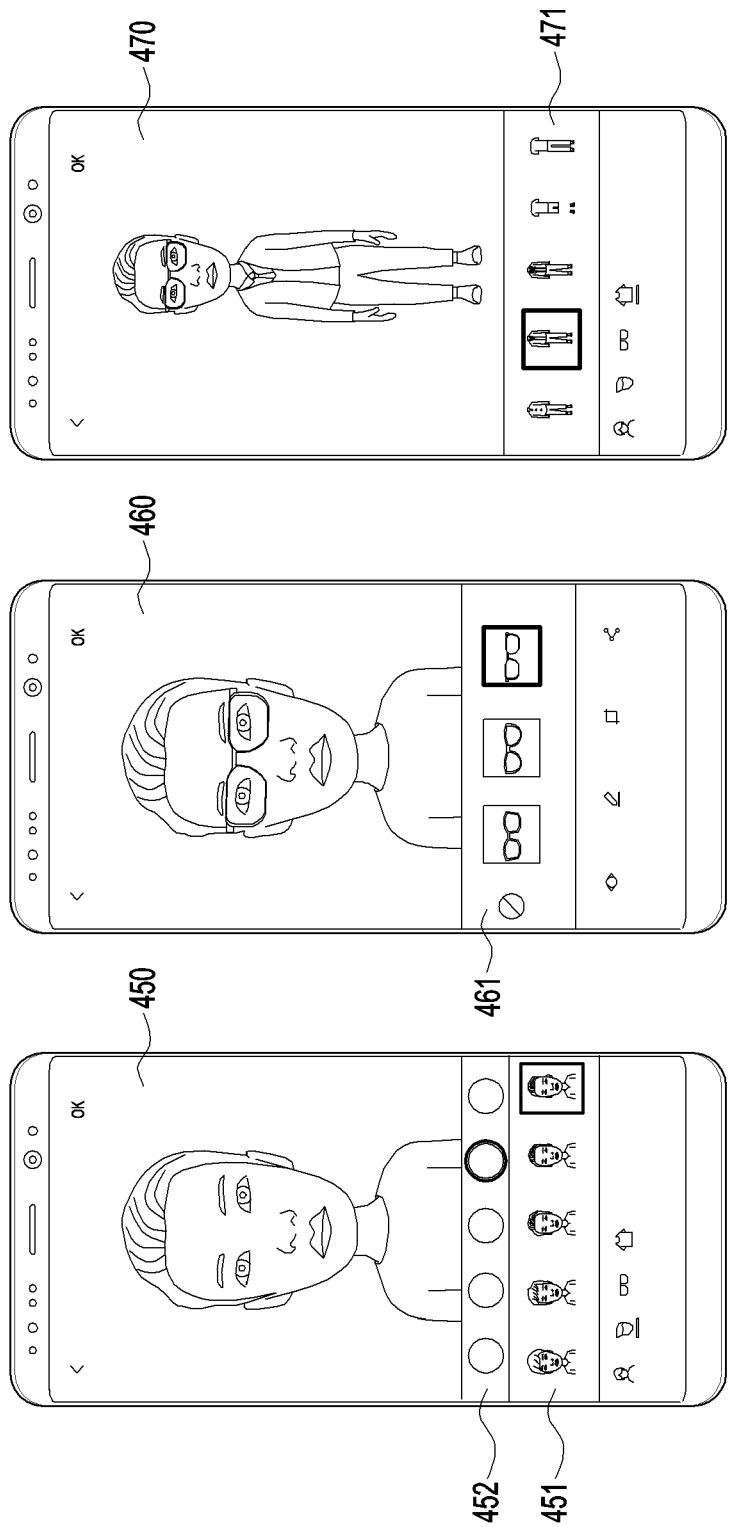

FIGS. 4A, 4B, and 4C illustrate a 3D graphic object generated by an electronic device and graphic attributes which can be applied to the 3D graphic object according to various embodiments of the disclosure.

Referring to FIG. 4A, the electronic device 101 may display screens 410 and 420 including at least one 3D graphic object generated based on a user's face image. The electronic device 101 may generate a variety of 3D graphic objects by applying various attribute values related to the face. The electronic device 101 may generate a first 3D graphic object by applying eyes, a nose, and a mouth that are extracted from the user's face image to a 3D template. The electronic device 101 may generate a second 3D graphic object by correcting eyes, a nose, and a mouth extracted from the user's face image according to a predetermined correction reference and applying the corrected eyes, nose, and mouth to a 3D template. For example, the predetermined correction reference may be configured to change the size of eyes extracted from the user's face image to a predetermined value, change the position and shape of a nose to a predetermined value, and change the shape and color of lips to a predetermined value.

Referring to FIG. 4A, the electronic device 101 may display a first icon 411 corresponding to the first 3D graphic object and a second icon 412 corresponding to the second 3D graphic object, and may display the first 3D graphic object on the screen 410 when the first icon 411 is selected according to user input and display the second 3D graphic object on the screen 420 when the second icon 412 is selected according to user input.

The electronic device 101 may simultaneously display the 3D graphic object and an icon indicating attributes which can be applied to the 3D graphic object. Referring to FIG. 4B, the electronic device 101 may display a slider control 413 for selecting attributes of a skin tone of the 3D graphic object and darken or lighten the skin tone according to a user input for the slider control 413. The electronic device 101 may display a screen 430 on which the 3D graphic object with a dark skin tone is displayed in response to the user input of darkening the skin tone and display a screen 440 on which the 3D graphic object with a light skin tone is displayed in response to the user input of lightening the skin tone.

The electronic device 101 may define one or more attributes which can be applied to the 3D graphic object as parameters and designate default attribute values to the parameters. The electronic device 101 may extract attribute values corresponding to one or more attributes which can be applied to the 3D graphic object from the 2D image. The one or more attributes which can be applied to the 3D graphic object may correspond to one or more attributes which can be applied to the external object included in the 2D image. For example, eyes, a nose, a mouth, a hair style, or glasses which can be applied to the external object may be applied to the 3D graphic object. The electronic device 101 may determine attribute values for the one or more attributes which can be applied to the 3D graphic object in accordance with a 3D template. The electronic device 101 may generate one or more attribute values which can be applied to the 3D graphic object based on user input. For example, referring to FIG. 4C, the electronic device 101 may provide a screen 450 for editing hairstyle attributes which can be applied to the 3D graphic object, a screen 460 for editing glasses accessory attributes, and a screen 470 for editing a 3D avatar outfit attributes. The electronic device 101 may provide a hairstyle list 451 and a hair color list 452 for the hairstyle attributes which can be applied to the 3D graphic object. The electronic device 101 may preferentially apply a first hairstyle selected from the hairstyle list 451 based on the attributes extracted from the 2D image or attributes set in accordance with the 3D template and display the first hairstyle on the 3D graphic object. For example, the electronic device 101 may select a hairstyle which matches facial type attributes based on the facial type attributes extracted from the 2D image as the first hairstyle and preferentially apply the selected hairstyle. The electronic device 101 may display the 3D graphic object to which the selected hairstyle and hair color are applied. The electronic device 101 may provide a glasses accessory list 461 which can be applied to the 3D graphic object, apply a selected glasses accessory to the 3D graphic object, and display the 3D graphic object. The electronic device 101 may provide a 3D avatar outfit list 471 which can be applied to the 3D graphic object and display the 3D graphic object to which a selected 3D avatar costume is applied.

Figure 5:
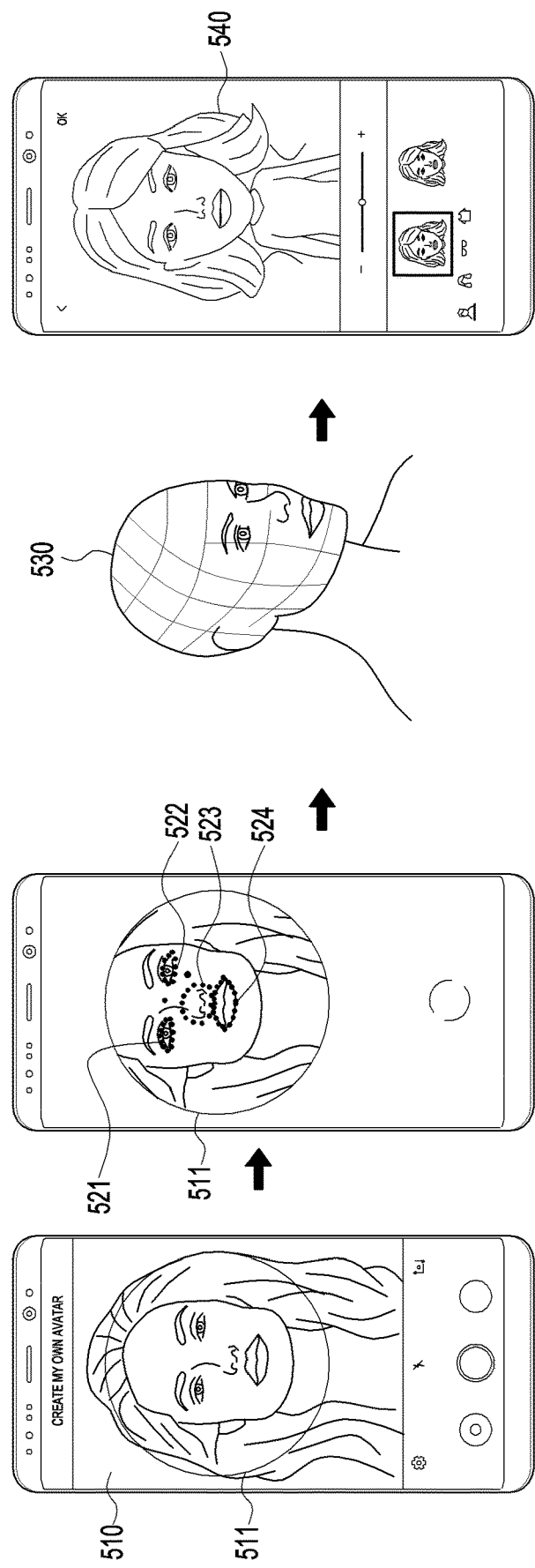
FIG. 5 illustrates an operation in which an electronic device generates a 3D avatar based on a two-dimensional (2D) image according to various embodiments of the disclosure.

FIG. 5 illustrates an operation in which an electronic device generates a 3D avatar based on a 2D image according to an embodiment of the disclosure.

Referring to FIG. 5, the electronic device 101 may extract an external object corresponding to a face from a 2D image including one or more external objects. Specifically, the electronic device 101 may extract an external object 511 corresponding to a face from a 2D image 510 including the user's face. The electronic device 101 may determine whether the face is included in the 2D image 510 through a face detection algorithm. For example, at least part of a method of extracting the external object may use a rule-based model or an artificial intelligence model learned according to at least one of machine learning, a nerve network, and a deep learning algorithm. The electronic device 101 may receive an artificial intelligence model from a server. For example, the electronic device 101 may extract the external object 511 corresponding to the face from the 2D image 510 through a multi-task cascaded neural network (MTCNN). The external object 511 may include eyes 521 and 522, a nose 523, or lips 524 indicating attributes related to the face. The electronic device 101 may define attributes which can be applied to the external object 511 as parameters and designate attribute values extracted from the external object 511 as parameter values. The attributes which can be applied to the external object 511 may include, for example, at least one of gender, race, age, attractiveness, facial expression hair color, part, hair length, cheekbone, face type, skin tone, eye position, eye size, eyebrow length, eyebrow shape, eyebrow size, nose length, nose position, nose shape, lip shape, lip color, lip length, hat, glasses, earrings, necklace, lipstick color, and necktie shape. For example, the electronic device 101 may define a parameter for gender and designate a female or male value. The electronic device 101 may determine a 3D template 530 for creating a 3D avatar. The 3D template may be varied according to the type of the 3D avatar to be generated. For example, the electronic device 101 may use different 3D templates depending on gender, race, nationality, or age. In another example, the electronic device 101 may generate a 3D avatar for an animal, a character, or a thing, and may use various 3D templates according to an animal shape, a character shape, or an object shape. The electronic device 101 may receive at least one 3D template from an external electronic device. The electronic device 101 may generate a 3D avatar 540 by applying attributes related to the external object 511 extracted from the 2D image 510 to the 3D template. The electronic device 101 may provide the 3D graphic object (not shown) generated through the application of the attributes related to the external object 511 extracted from the 2D image 510 to the 3D template. The attributes which can be applied to the external object may be applied to the 3D graphic object. The electronic device 101 may generate the 3D graphic object by reflecting attributes extracted from the external object or attributes selected by a user input and generate a 3D avatar 540 based on the 3D graphic object. The electronic device 101 may generate the 3D avatar 540 by applying the eye 521 of the external object 511 to an eye area of the 3D template 530. The electronic device 101 may generate the 3D avatar 540 with an attribute value designated to the 3D template 530 for attributes which are not extracted from the external object 511, for example, a hairstyle. The electronic device 101 may output one or more sample attributes of the attributes which can be applied to the external object to the user through the display (for example, the display device 160 of FIG. 1). The electronic device 101 may generate the 3D avatar 540 by applying attributes selected from the one or more sample attributes according to a user's selection. The electronic device 101 may select recommended attributes from the one or more sample attributes based on the attributes extracted from the 2D image or the determined 3D template and provide the recommended attributes. The electronic device 101 may provide a preview to the user by providing the 3D graphic object reflecting the sample attributes through the display device 160.

Figure 6:
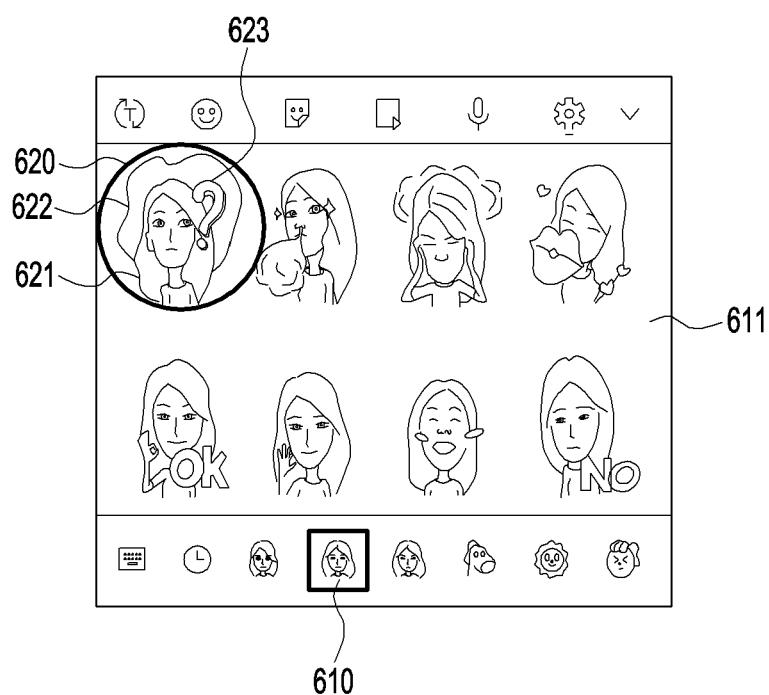
FIG. 6 illustrates a 2D image including at least one object generated using a 3D avatar by an electronic device according to various embodiments of the disclosure.

FIG. 6 illustrates a 2D image including at least one object generated using a 3D avatar by an electronic device according to various embodiments of the disclosure.

Referring to FIG. 6, the electronic device 101 may generate one or more objects by applying one or more facial expressions or motions designated to the 3D avatar. The object may be determined in accordance with at least one of a facial expression of the avatar, a gesture of the avatar, a background, and an animation effect. For example, the one or more designated facial expressions or motions may be designated to at least one of the facial expression of the avatar, the gesture of the avatar, the background, and the animation effect. For example, a smile, crying, or a remote expression may be used for the facial expression of the avatar, and a gesture of making a heart with hands or a gesture of nodding an avatar's head may be used for the gesture of the avatar. At least one of the facial expression of the avatar, the gesture of the avatar, the background, and the animation effect may be designated as a motion. The electronic device 101 may generate at least one object by applying the designated facial expression or motion through the avatar generated for the external object corresponding to the face extracted from the 2D image that is obtained using the camera (for example, the camera module 180 of FIG. 1). The electronic device 101 may generate a predetermined number of objects at a time by applying a predetermined number of facial expressions or motions to the 3D avatar. For example, the electronic device 101 may generate 18 different objects by applying a set of 18 predetermined expressions to the 3D avatar. The set of 18 predetermined expressions may be designated by changing at least one of the facial expression of the avatar, the gesture of the avatar, the background, and the animation effect. The 2D image including one or more objects may be an avatar character. The electronic device 101 may output the avatar character through the display (for example, the display device 160 of FIG. 1).

The electronic device 101 may generate one or more avatar characters through one or more 3D avatars and provide a 3D avatar character list through the display device 160. For example, the electronic device 101 may display an avatar character 610 on the display device 160 and display one or more objects included in the avatar character 610 in a first area 611. The first area 611 may include a plurality of objects of which at least one of facial expressions of the avatar, gestures of the avatar, backgrounds, and animation effects are different. A first object 620 among the one or more objects included in the avatar character 610 may include an avatar 621 and a background 622. The avatar 621 of the first object 620 may be generated according to a predetermined facial expression or gesture and the background 622 of the first object 620 may include an additional object 623. An animation effect may be applied to the avatar 621 or the background 622 of the first object 620. For example, the additional object 623 of the background 622 may include an effect moving leftward and rightward. The avatar character may be a still image or a moving image. When the avatar character is a moving image, at least one of the facial expression of the avatar of the object, the gesture of the avatar, the background, and the additional object may move.

Figure 7:
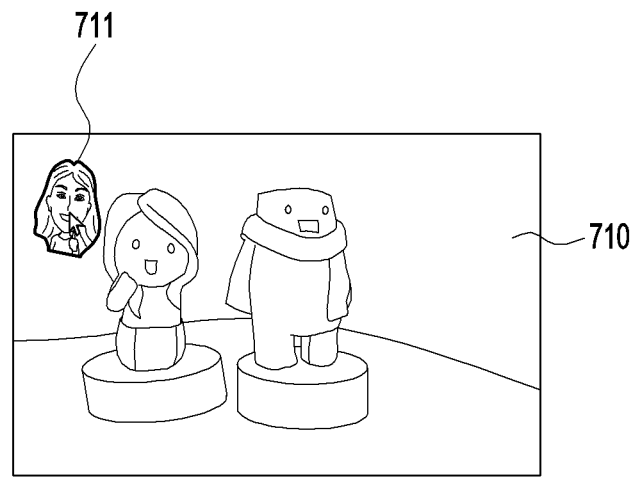
FIG. 7 illustrates editing a photo using an avatar character by an electronic device according to various embodiments of the disclosure.
Figure 7:
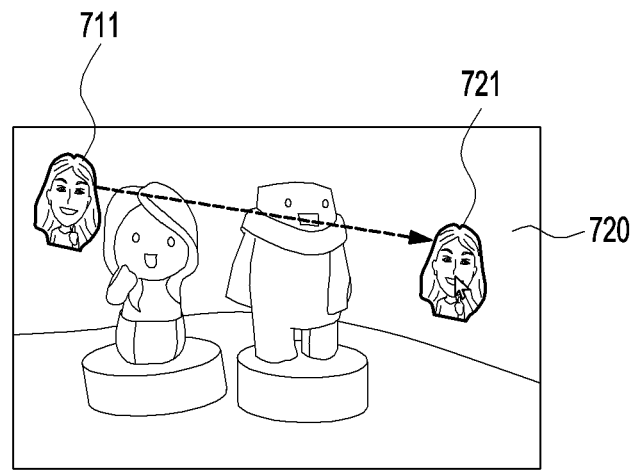
Figure 7:
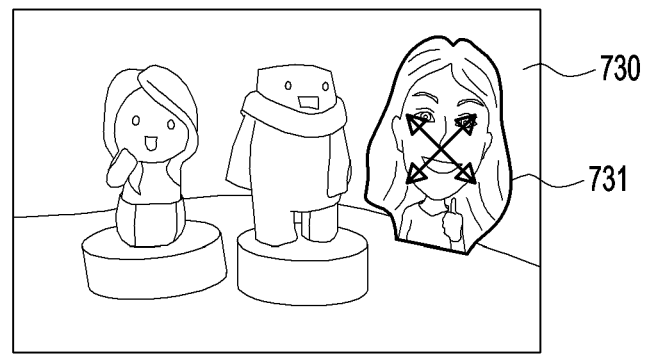

FIG. 7 illustrates editing a photo using an avatar character by the electronic device according to various embodiments of the disclosure.

Referring to FIG. 7, the electronic device 101 may display a selected object of the avatar character in a first position 711 on a photo edit screen 710. The electronic device 101 may move the object from the first position 711 to another position according to user input. The electronic device 101 may display the photo edit screen 720 on which the object has moved to a second position 721. The electronic device 101 may change the size or direction of the object according to user input. The electronic device 101 may display a photo edit screen 730 including an object 731 of which the size or direction is changed.

Figure 8:
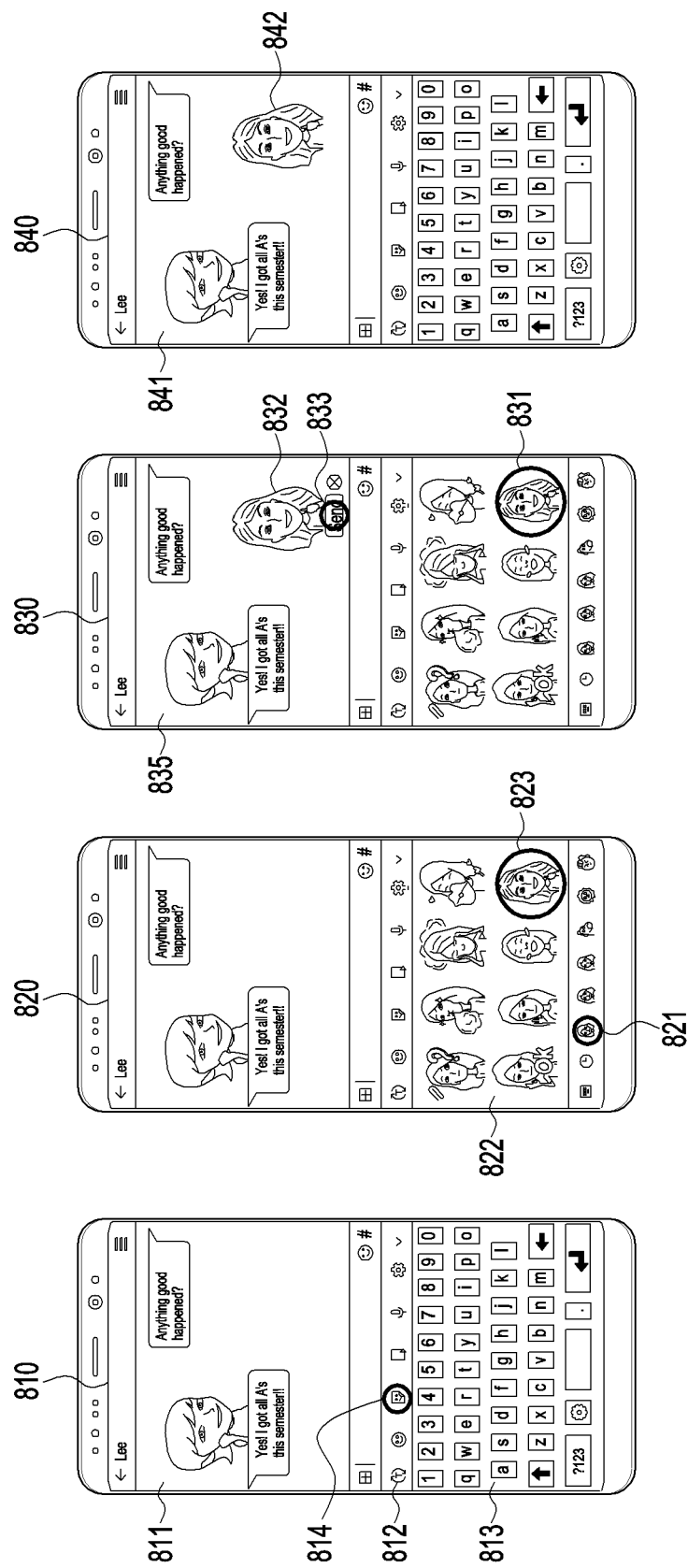
FIG. 8 illustrates transmitting a selected object of an avatar character through a message by an electronic device according to various embodiments of the disclosure.

FIG. 8 illustrates transmitting a selected object of an avatar character through a message by an electronic device according to various embodiments of the disclosure.

Referring to FIG. 8, the electronic device 101 may provide the avatar character generated using the 3D avatar through a keyboard application. The electronic device 101 may provide the avatar character included in the keyboard application through a message transmission application. For example, the electronic device 101 may provide a screen area 810 in which an application for transmitting a message is executed. The screen area 810 may include a first area 811 for displaying the content of the message, a second area 812 for displaying an item list for writing the message, and a third area 813 for selecting items to input into the message. The items for input into the message may include a text input item, a photo input item, a file attachment item, a voice input item, a position transmission item, or an avatar character input item.

The electronic device 101 may provide, as an avatar character, a second image including at least one object in which a predetermined facial expression or motion is reflected using a 3D avatar generated in accordance with an external object included in a first image obtained through the camera (for example, the camera module 180 of FIG. 1). The avatar character input item may be included in the items for inputting into the message. The electronic device 101 may display the second area 812 including the avatar character input item 814. The electronic device 101 may provide the avatar character in the third area in response to a selection of the avatar character input item 814 in the displayed item list.

The electronic device 101 may display, in a first area 822, one or more objects included in a first avatar character 821 selected from one or more avatar characters in the screen area 820 in which the application for sending a message is executed. The electronic device 101 may provide one or more avatar characters in a list form. The one or more objects included in the first avatar character 821 may include different facial expressions or motions. For example, a first object 823 may include a smile.

The electronic device 101 may display a preview 832 and a send button of the first object 831 in a first area 835 for displaying the content of the message in response to a selection of the first object 831 among the one or more objects displayed in the screen area 830 in which the application for sending the message is executed. When the first object 831 is a moving image, the electronic device 101 may play the first object 831 and provide the preview 832. The electronic device 101 may transmit the selected first object 831 through the message in response to clicking the send button 833. The electronic device 101 may display and provide, in a first area 841 for displaying the content of the message, a selected first object 842 of the avatar character in the screen area 840 in which the application for sensing the message is executed.

Figure 9:
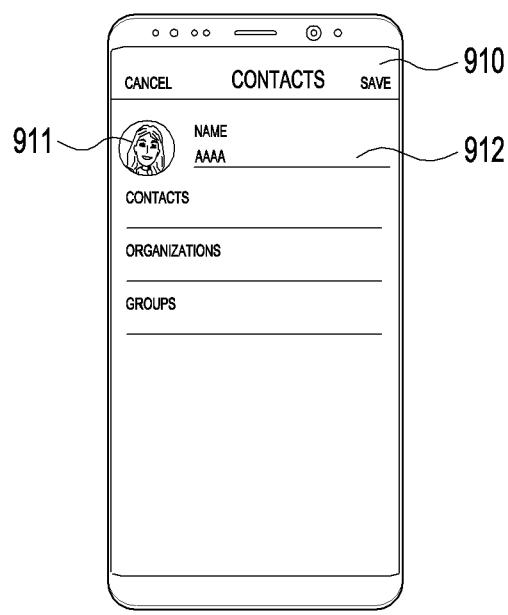
FIG. 9 illustrates editing contacts to include an avatar character by an electronic device according to various embodiments of the disclosure.

FIG. 9 illustrates editing contacts to include an avatar character by an electronic device according to various embodiments of the disclosure.

Referring to FIG. 9, the electronic device 101 may display a photo item 911 and a name item 912 in an application execution screen area 910 for storing and managing contacts. The electronic device 101 may display an object selected from one or more objects included in the avatar character in the photo item 911 of the contact. According to various embodiments, the electronic device 101 may provide the photo item and the name item of the contact to the display (for example, the display device 160 of FIG. 1) in response to receiving a call and display an object stored in the photo item of the contact.

Figure 10:
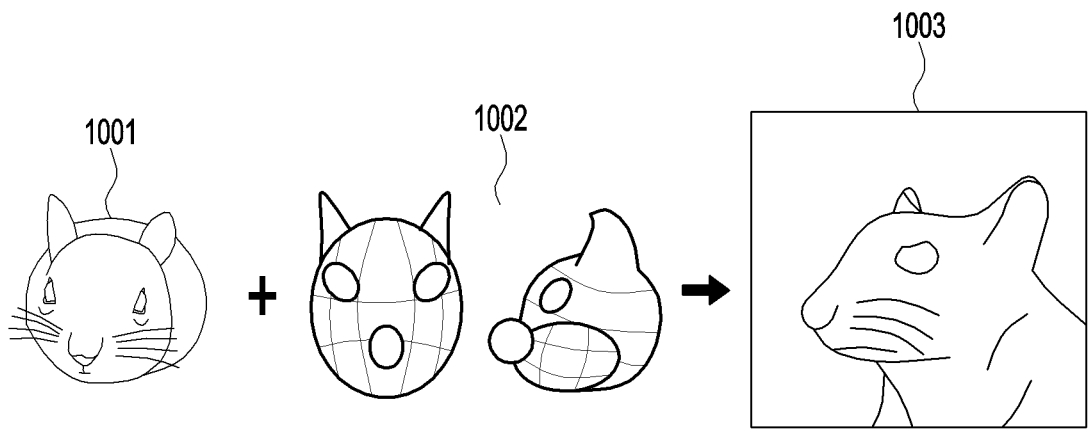
FIG. 10 illustrates a 3D avatar generated based on a 2D image including an animal head by an electronic device according to various embodiments of the disclosure.

FIG. 10 illustrates a 3D avatar generated based on a 2D image including an animal head by an electronic device according to various embodiments of the disclosure.

Referring to FIG. 10, when an external object is an animal, the electronic device 101 may generate a 3D avatar using a 3D template corresponding to the animal. The electronic device 101 may obtain a 2D image 1001 including a mouse's head. The electronic device 101 may detect head-related attributes from the 2D image 1001 including the mouse's head or may transmit the 2D image 1001 to an external electronic device or a server and the external electronic device or the server may detect head-related attributes. The electronic device 101, the external electronic device, or the server may determine a 3D template 1002 corresponding to mouse head attributes based on the head-related attributes. The electronic device 101 may receive the 3D template 1002 from the external electronic device or the server. The electronic device 101 may generate a 3D avatar 1003 by applying mouse's head-related attributes extracted from the 2D image 1001 to the 3D template 1002. For example, the mouse's head-related attributes may include at least one of shapes of elements of the head (eyes, eyebrows, cheekbone, lips, teeth, cheek, chin, forehead, hair, mustache (beard), ears, the back of the head, and a temple region), colors, the relative position between the elements, and the relative size ratio between the elements. In order to extract an external object corresponding to the animal's head from the 2D image 1001, the electronic device 101 may use information generated by analyzing and determining characteristics of the animal's head.

Figure 11:
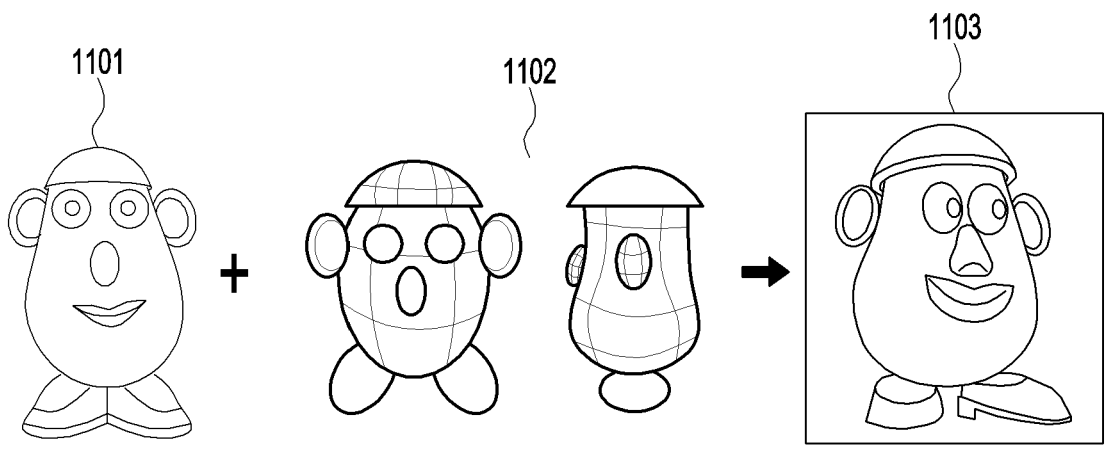
FIG. 11 illustrates a 3D avatar generated based on a 2D image including a character by an electronic device according to various embodiments of the disclosure.

FIG. 11 illustrates a 3D avatar generated based on a 2D image including a character by an electronic device according to various embodiments of the disclosure.

Referring to FIG. 11, when an external object is a character, the electronic device 101 may generate a 3D avatar using a 3D template corresponding to the character. The electronic device 101 may receive the 3D template corresponding to the character from an external electronic device or a server. The electronic device 101 may obtain a 2D image 1101 including a character. For example, the character may include at least one of a cartoon character, an animal character, a plant character, a character of a particular person, a character of a thing, and a movie hero character. The electronic device 101 may determine the 3D template 1102 corresponding to the character. The electronic device 101 may generate the 3D avatar 1103 by applying attributes related to the character extracted from the 2D image 1101 to the 3D template 1102. For example, the attributes related to the character may include one or more of shapes of elements of the character (head, aims, legs, and body), colors, the relative position between the elements, the relative size between the elements, and accessories which can be applied to the elements (hair band, bag, glasses, and items).

Figure 12:
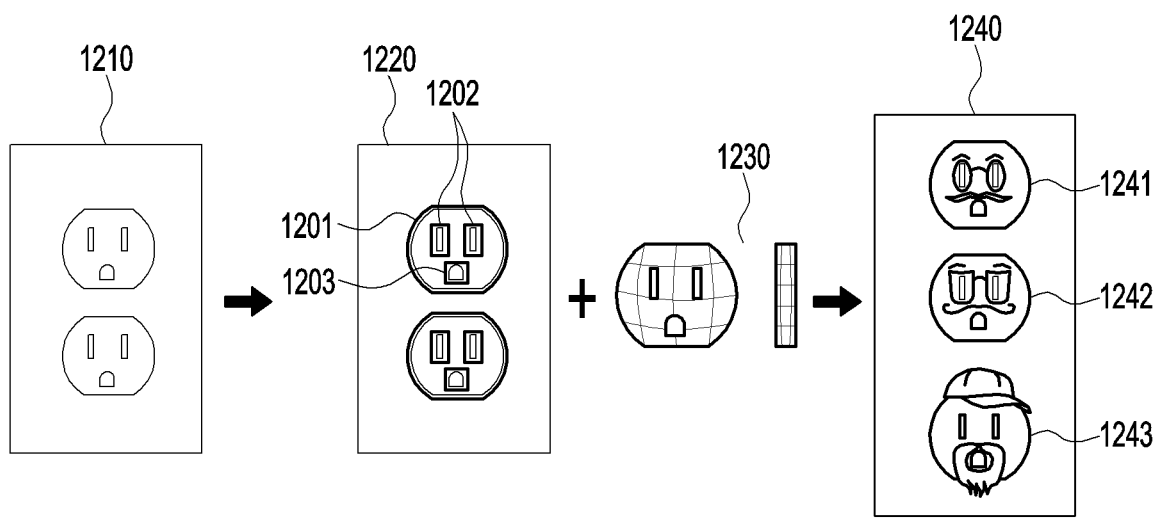
FIG. 12 illustrates a 3D avatar generated based on a 2D image including an accessory by an electronic device according to various embodiments of the disclosure.

FIG. 12 illustrates a 3D avatar generated based on a 2D image including an accessory by an electronic device according to various embodiments of the disclosure.

Referring to FIG. 12, the electronic device 101 may obtain a 2D image 1210 including an electrical outlet. The electronic device 101 may extract a configuration corresponding to attributes related to a face from the electrical outlet through a face feature extraction algorithm. According to various embodiments, the electronic device 101 may designate attributes related to the face from the 2D image 1210 according to user input. The electronic device 101 may designate a first configuration 1201 of the electrical outlet as a face form in the 2D image 1220 according to a user input, second configurations 1202 of the electrical outlet as eyes, and a third configuration 1203 of the electrical outlet as a mouth. The electronic device 101 may designate a 3D template 1230 to generate a 3D avatar corresponding to the electrical outlet. The electronic device 101 may select a 3D template similar to the electrical outlet among one or more 3D templates or use a predetermined 3D template. The electronic device 101 may generate a 3D avatar by applying face-related attributes values associated with the configurations 1201, 1202, and 1203 to the 2D image 1210 to the 3D template 1230. The electronic device 101 may generate one or more objects 1241, 1242, and 1243 by reflecting expression attributes related to a predetermined facial expression through the 3D avatar. The electronic device 101 may provide a 2D image 1240 including one or more objects.

FIGS. 13 and 14 illustrate expression attributes related to a face according to various embodiments of the disclosure.

The electronic device (for example, the electronic device 101 or the processor 120 of FIG. 1) may variously change facial expressions of a 3D avatar at least using expression attributes related to a face. The expression attributes related to the face may be classified according to circumstances and may be defined according to elements included in the face.

Referring to FIG. 13, circumstances may include normal, smile 1, and smile 2, expression attributes corresponding to eyes may be defined by shapes, and expression attributes corresponding to a mouth may be defined by shapes. The electronic device 101 may not designate attributes of eyes but may designate an attribute value of a mouth as an upwardly rounded semicircular shape in the normal circumstance. The electronic device 101 may directly apply the attribute value of the eyes extracted from the 2D image and may change the attribute value of the mouth extracted from the 2D image to the semicircular shape according to expression attributes and apply the changed value in order to generate the 3D avatar in the normal circumstance. The electronic device 101 may classify and designate similar circumstances as one circumstance.

Referring to FIGS. 12 and 13, the electrical outlet of FIG. 12 indicates a facial expression corresponding to the normal circumstance in FIG. 13. According to an embodiment, the electronic device 101 may detect attributes of a face element from an image including a face object received through the camera module 180, determine expression attributes corresponding to the detected attributes of the face element, and change a 3D avatar in accordance with the determined expression attributes. Accordingly, the electronic device 101 may detect a change from the face image received in real time, change a 3D avatar 1230 in accordance therewith, and change one or more objects 1241, 1242, and 1243 according thereto.

Referring to FIG. 14, the electronic device 101 may classify a general circumstance, a default circumstance, and a standby circumstance as one circumstance and define expression attributes corresponding to eyes as expression attribute set 1 and expression attribute set 2. FIG. 14 illustrates a plurality of expression attribute sets related to eyes and each of other elements (for example, the nose, the mouth, and the ears) may have a plurality of expression attribute sets although not illustrated. According to an embodiment, the expression attribute sets of different elements may have a correlation therebetween. For example, expression attribute set 1 of the eyes and expression attribute set 1 of the mouth may have a correlation therebetween and expression attribute set 2 of the eyes and expression attribute set 2 of the mouth may have a correlation therebetween. For example, one attribute group may include expression attribute sets having a correlation therebetween. For example, in the case of avatar character 1, attribute group 1 corresponding thereto may include expression attribute set 1 of the eyes and expression attribute set 1 of the mouth having the correlation therebetween.

Figure 15:
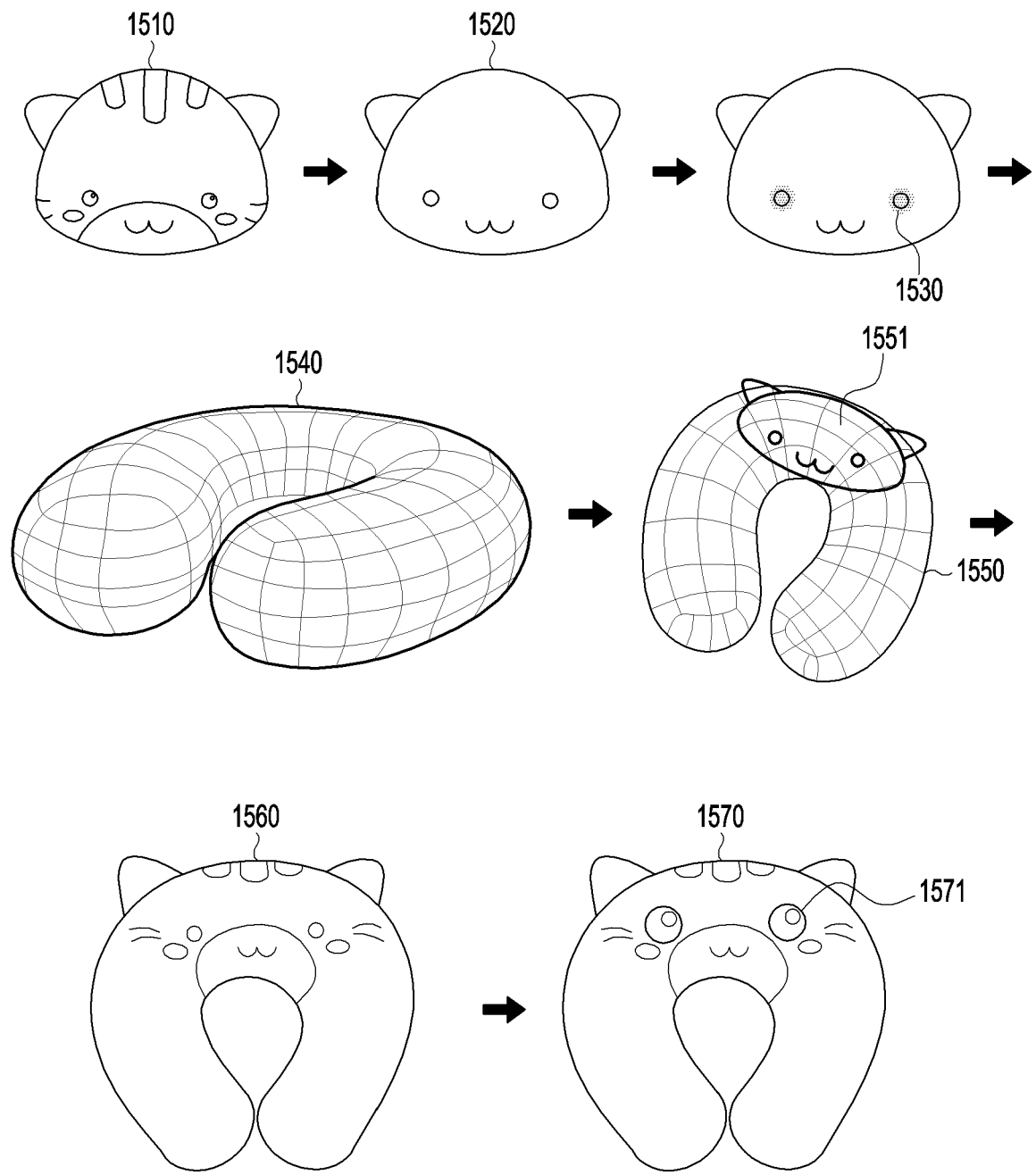
FIG. 15 illustrates a 3D avatar generated using various 3D templates by an electronic device according to various embodiments of the disclosure.

FIG. 15 illustrates a 3D avatar generated using various 3D templates by an electronic device according to various embodiments of the disclosure.

Referring to FIG. 15, the electronic device 101 may generate a 3D avatar based on a 2D image including an external object. The electronic device 101 may determine whether an external object included in a 2D image 1510 includes a face, and when the face is included, may extract the face. The electronic device 101 may extract a face area 1520 including ears, eyes, and a mouth from the external object. The electronic device 101 may select a target 1530 to which expression attributes are applied in the face area 1520. For example, the electronic device 101 may provide the extracted face area 1520 through a display (for example, the display device 160 of FIG. 1) and select eyes for the target 1530 in the displayed face area 1520 according to user input. The electronic device 101 may determine a 3D template 1540 for creating a 3D avatar. The electronic device 101 may select the 3D template 1540 different from the external object corresponding to the face of the 2D image 1510. For example, the electronic device 101 may determine a 3D template corresponding to a 3D avatar according to user input. When the 3D template 1540 does not include a configuration corresponding to the face, the electronic device 101 may select a matching area of the 3D template 1540 in order to apply the face of the external object extracted from the 2D image 1510 to the 3D template 1540. The electronic device 101 may determine to match the face area 1520 of the external object with a first position 1551 of the 3D template 1550. At this time, the electronic device 101 may further include an operation for displaying a candidate area of the 3D template 1550 with which the face area 1520 of the external object may match and selecting the candidate area. For example, the candidate area may further include an operation for determining whether a condition (for example, a template size and shape) under which the face area 1520 of the external object can be disposed on the 3D template 1550 is satisfied. According to an embodiment, the shape of the 3D template 1550 may be changed based on the face area 1520 of the external object to match therewith. For example, the electronic device 101 may determine another 3D template (not shown) which is changed in accordance with some (for example, ears) of the face area 1520 that does not match the first position 1551 of the 3D template 1540 or has a high similarity.

The electronic device 101 may apply an attribute value of the face area 1520 to the first position 1551 of the 3D template 1540. The electronic device 101 may display a 3D graphic object 1560 generated by applying attributes of the external object 1510 to the 3D template 1540. The electronic device 101 may apply predetermined expression attributes to the target selected from the 3D graphic object 1560 to apply expression attributes. The electronic device 101 may generate a 3D avatar 1570 by applying smiling expression attributes to eyes 1571 selected from the 3D graphic object 1560. According to an embodiment, when selecting a target to which expression attributes are applied in the 3D graphic object 1560 and selecting expression attributes, the electronic device 101 may detect attributes of face elements from a face image (for example, a face of a person, an animal, or a character) additionally received through the camera module 180 and determine one or more targets (for example, elements (for example, eyes 1571) of the external 3D graphic object 1560) and expression attributes corresponding to the targets based on the detection (for example, attribute change detection) to generate the 3D avatar 1570.

Figure 16:
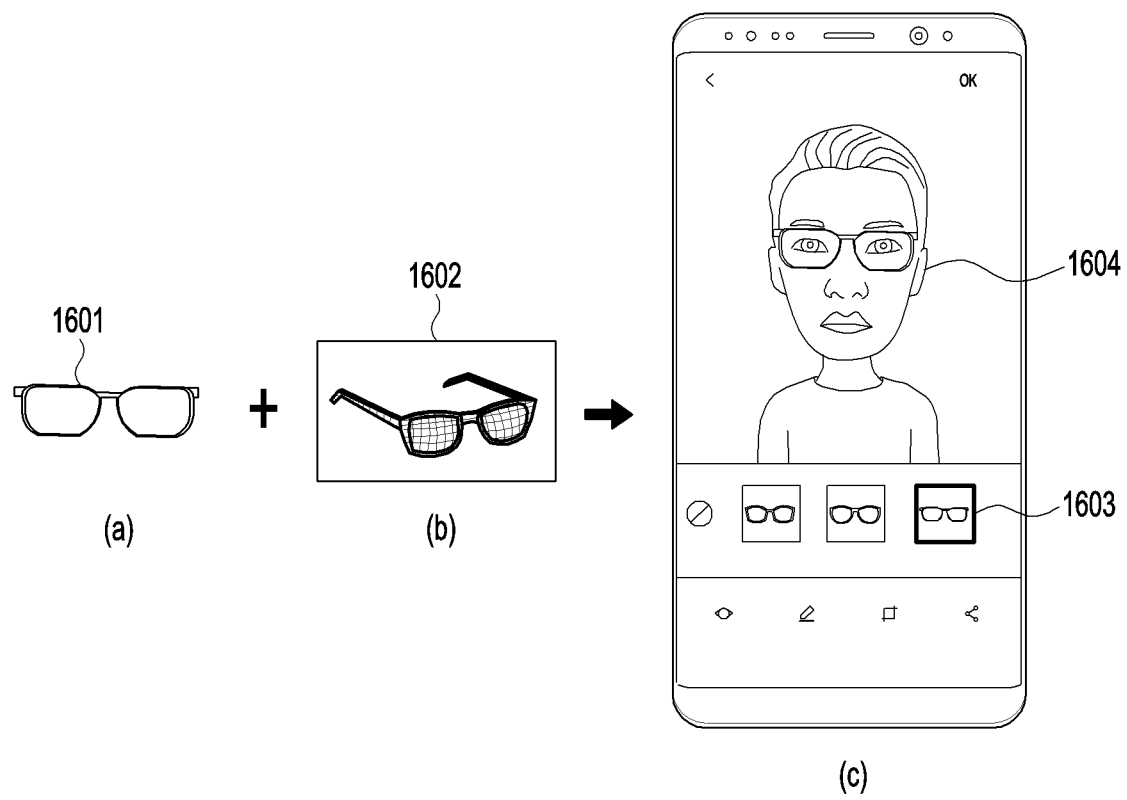
FIGS. 16 and 17 illustrate attributes related to a 3D graphic object generated based on a 2D image by an electronic device according to various embodiments of the disclosure.
Figure 17:
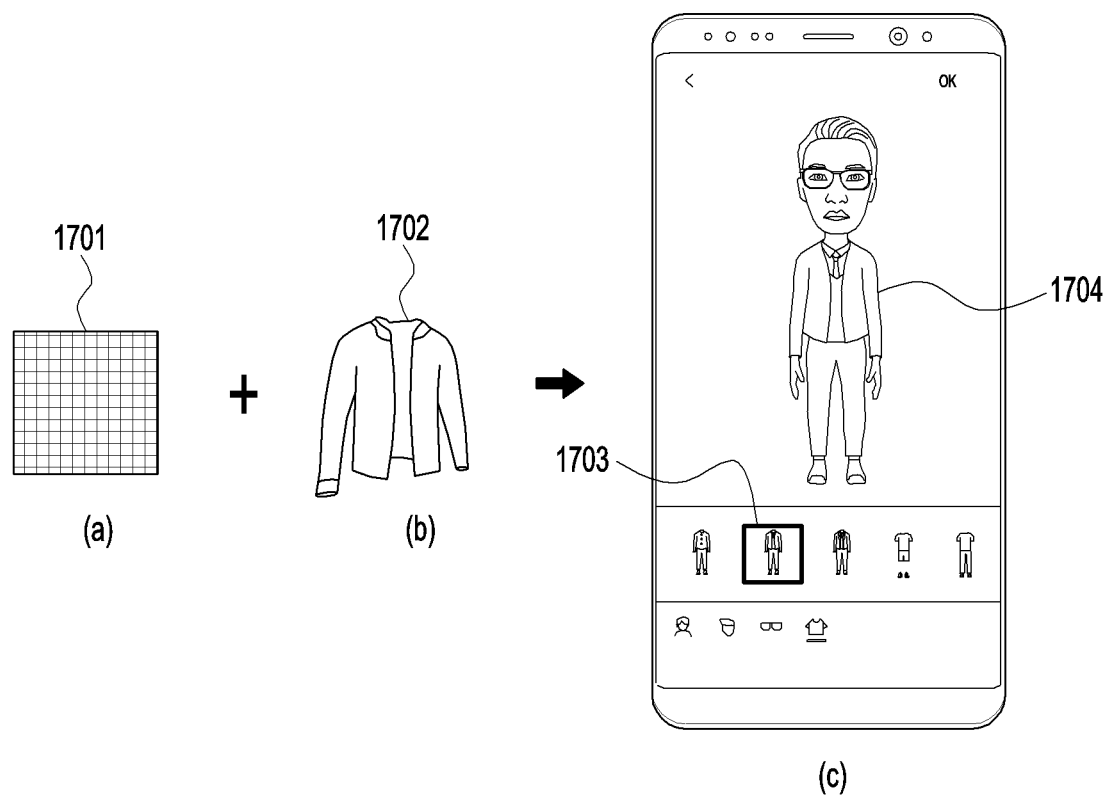

FIGS. 16 and 17 illustrate attributes related to a 3D graphic object generated based on a 2D image by an electronic device according to various embodiments of the disclosure.

Referring to FIG. 16, the electronic device 101 may generate graphic attributes which can be applied to the 3D graphic object. In particular, the electronic device 101 may obtain a 2D image 1601 including an accessory which can be applied to the 3D graphic object. The electronic device 101 may generate one or more attributes which can be applied to the 3D graphic object based on the 2D image obtained through the camera (for example, the camera module 180 of FIG. 1). The one or more attributes which can be applied to the 3D graphic object may include, for example, at least one of gender, race, age, attractiveness, facial expression, hair color, part, hair length, cheekbone, face type, skin tone, eye position, eye size, eyebrow length, eyebrow shape, eyebrow size, nose length, nose position, nose shape, lip shape, lip color, lip length, hat, glasses, earrings, necklace, lipstick color, and necktie shape. The electronic device 101 may provide guide information for describing an operation of generating one or more attributes which can be applied to the 3D graphic object through the display (for example, the display device 160 of FIG. 1). For example, the electronic device 101 may provide a list of one or more attributes which can be applied to the 3D graphic object through the display device 160. The electronic device 101 may provide guide information for camera photography through the display device 160 in order to generate attributes selected by user input. The electronic device 101 may provide, for example, guide information such as "photograph glasses at the center of the screen" in order to generate glasses attributes. The electronic device 101 may obtain a 2D image 1601 including glasses through the camera module 180. The electronic device 101 may determine a 3D template 1602 corresponding to the glasses extracted from the 2D image 1601. The electronic device 101 may make a request for or receive at least one template related to a thing extracted from the 2D image 1601 from an external electronic device or a server in order to determine the 3D template corresponding to the thing extracted from the 2D image 1601. For example, the electronic device 101 may search for the name of the thing and obtain a 3D template.

The electronic device 101 may extract attributes related to the glasses extracted from the 2D image 1601 and apply an attribute value of the extracted glasses to the 3D template 1602 to generate graphic attributes 1603. The electronic device 101 may display the generated graphic attributes 1603 in a graphic attribute list area. The electronic device 101 may apply the generated graphic attributes 1603 to the 3D graphic object 1604 and display the 3D graphic object 1604 in order to provide a preview to the user. The electronic device 101 may provide a function of changing or deleting the generated graphic attributes 1603. The electronic device 101 may obtain another 2D image through the camera module 180 in order to change the generated graphic attributes 1603. The electronic device 101 may change the 3D template 1602 corresponding to the glasses in order to change the generated graphic attributes 1603.

Referring to FIG. 17, the electronic device 101 may obtain a 2D image 1701 including attributes which can be applied to a 3D graphic object. The electronic device 101 may extract attributes from the 2D image 1701. Attributes which can be applied to the 3D graphic object may include a color, a pattern, or a shape. For example, the attributes may be a check pattern with a red color. The electronic device 101 may select a 3D template 1702 to which the attributes extracted from the 2D image 1701 are applied. The electronic device 101 may select the 3D template 1702 corresponding to a top and apply the extracted attributes to the selected 3D template 1702 to generate graphic attributes 1703. The electronic device 101 may provide the generated graphic attributes 1703 through the display device 160, and when the graphic attributes 1703 are selected, may apply the graphic attributes 1703 to the 3D graphic object 1704 and display the 3D graphic object 1704.

Figure 18:
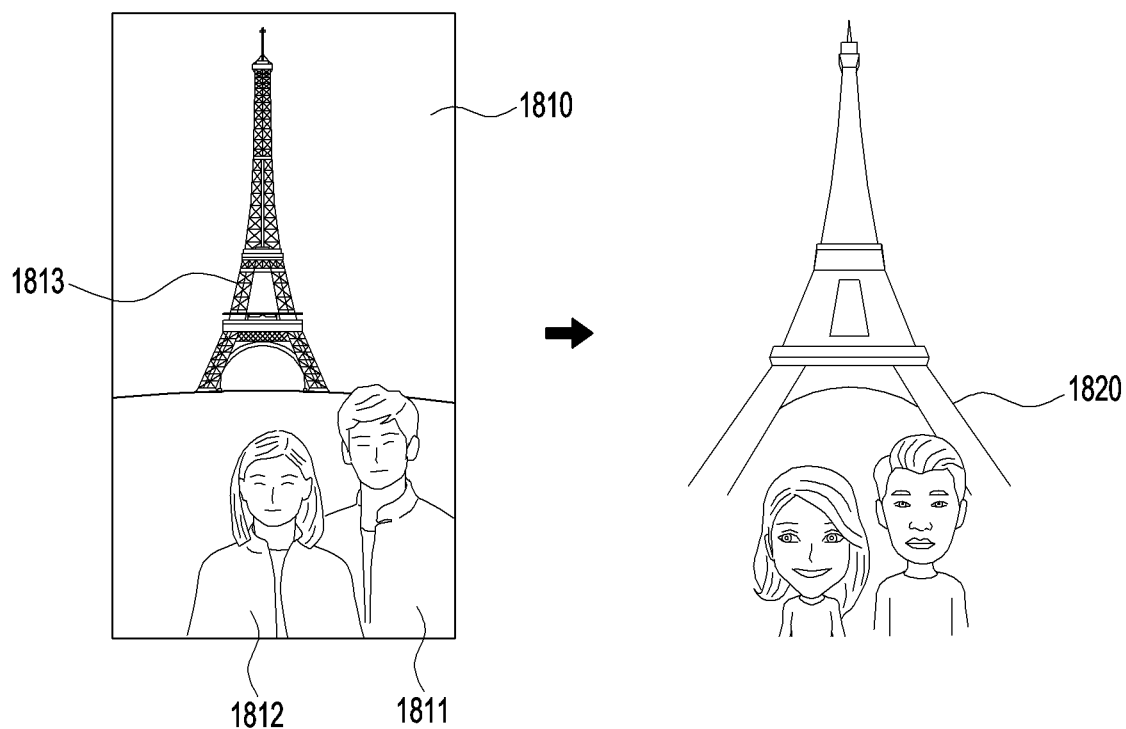
FIG. 18 illustrates a 3D avatar generated based on a 2D image including an external object corresponding to a face and an additional object by an electronic device according to various embodiments of the disclosure.

FIG. 18 illustrates a 3D avatar generated based on a 2D image including an external object corresponding to a face and an additional object by an electronic device according to various embodiments of the disclosure.

Referring to FIG. 18, the electronic device 101 may extract one or more external objects 1811, 1812, and 1813 included in a 2D image 1810. The electronic device 101 may determine whether the one or more extracted external objects 1811, 1812, and 1813 correspond to faces. For example, the electronic device 101 may determine that the first external object 1811 and the second external object 1812 correspond to human faces and that the third external object 1813 does not correspond to the face. The electronic device 101 may generate a 3D avatar including the external object which does not correspond to the face. The electronic device 101 may determine whether one or more external objects are included in predetermined additional objects. The additional objects indicate objects which do not correspond to the face but can be included in the 3D avatar and be, for example, landmarks, characters, or objects designated by the user. When the one or more external objects included in the 2D image correspond to landmarks, characters, or objects designated by the user, the electronic device 101 may generate a 3D avatar including the external objects.

Referring to FIG. 18, the 2D image 1810 may include two people and the Eiffel Tower. The electronic device 101 may determine that the Eiffel Tower is the additional object and generate a 3D avatar including the Eiffel Tower. The electronic device 101 may generate a 3D avatar 1820 including the first external object 1811 corresponding to the face, the second external object 1812 corresponding to the face, and the third external object 1813 corresponding to the Eiffel Tower. The electronic device 101 may generate each 3D graphic object based on the first external object 1811, the second external object 1812, and the third external object 1813 and determine graphic attributes which can be applied to the 3D graphic objects to generate the 3D avatar 1820. The electronic device 101 may generate the 3D avatar 1820 by applying a facial expression of the avatar, a gesture of the avatar, a background, and an animation effect to at least one of the first external object 1811, the second external object 1812, and the third external object 1813. For example, the electronic device 101 may apply a surprised look to the first external object 1811, apply a body gesture of making a heart with fingers to the second external object 1812, or control the size of the third external object 1813.

Figure 19A:
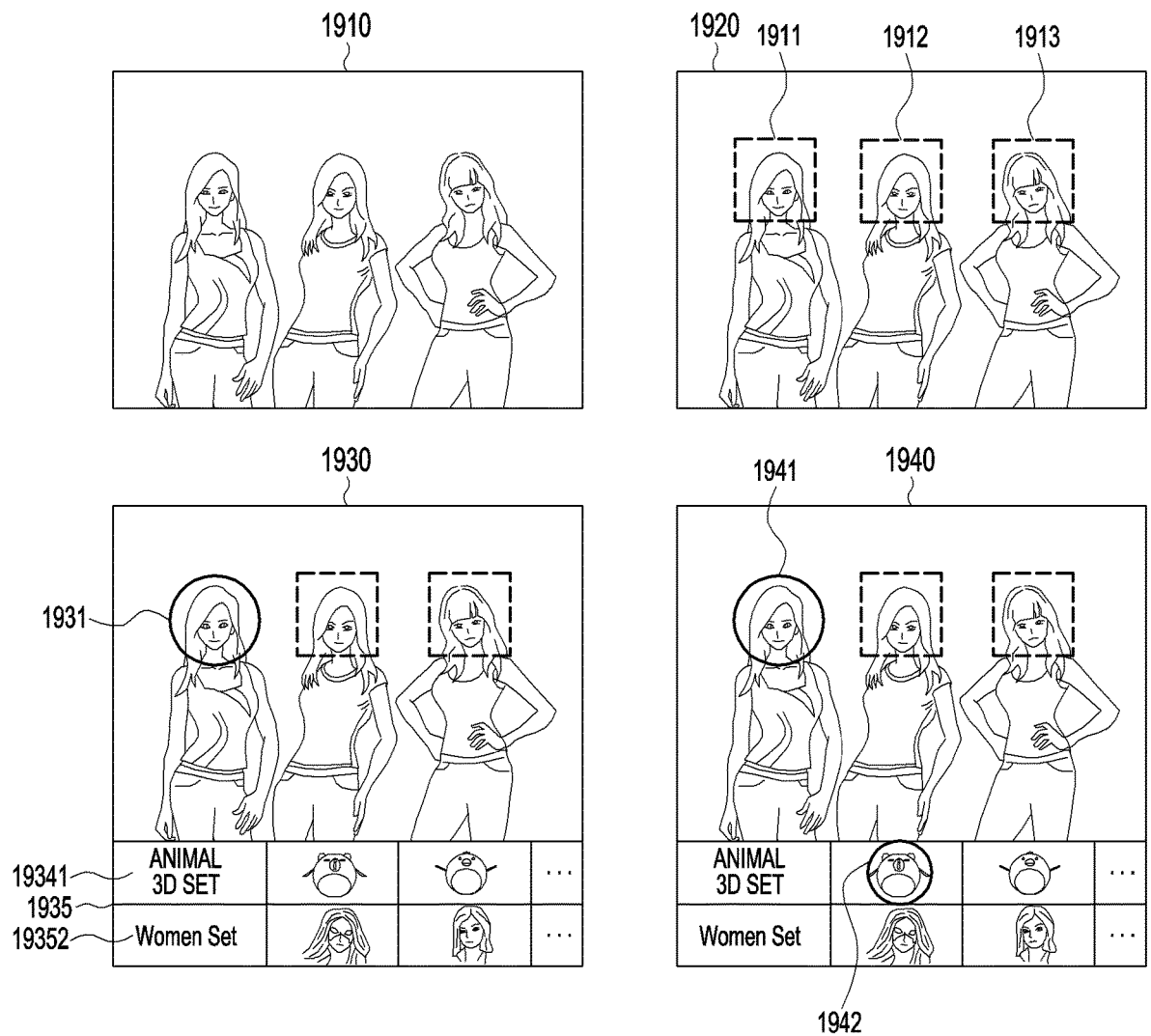
FIGS. 19A and 19B illustrate an operation in which an electronic device generates an image including a plurality of 3D avatars according to various embodiments of the disclosure.
Figure 19B:
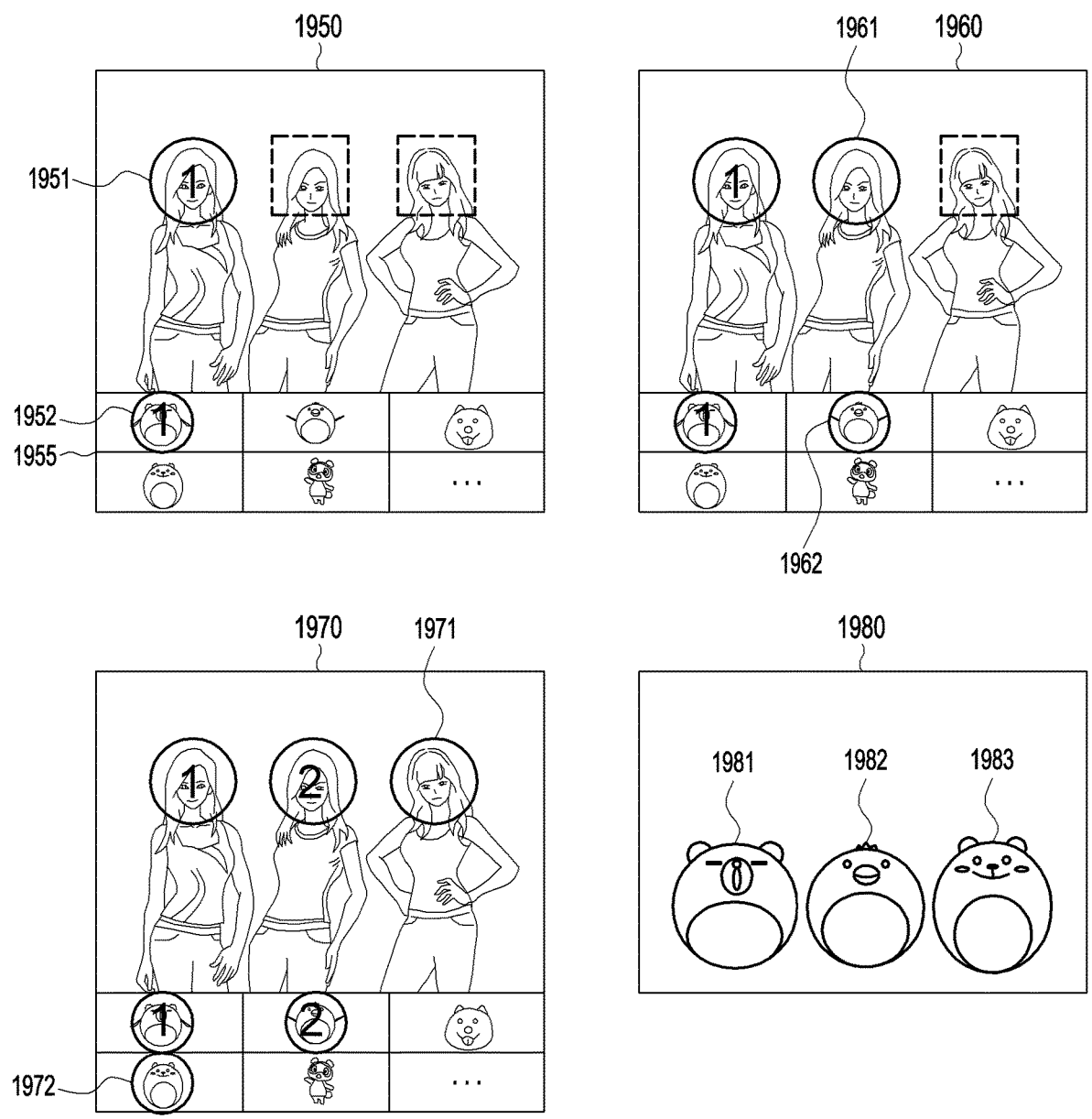
Figure 20:
FIG. 20 illustrates expression attributes of a 3D avatar according to various embodiments of the disclosure.
Figure 20:
Figure 20:
Figure 20:

FIGS. 19A and 19B illustrate an operation in which an electronic device generates an image including a plurality of 3D avatars according to various embodiments of the disclosure and FIG. 20 illustrates expression attributes of a 3D avatar according to various embodiments of the disclosure.

Referring to FIG. 19A, the electronic device 101 may select one or more external objects corresponding to faces based on a 2D image including a plurality of external objects and generate 3D avatars corresponding to the selected external objects. Specifically, the electronic device 101 may obtain a 2D image 1910 including three human faces. The electronic device 101 may extract one or more external objects from the 2D image 1910 and determine whether the extracted external objects correspond to faces. The electronic device 101 may display identifiers (for example, dotted squares) indicating external objects 1911, 1912, and 1913 corresponding to the extracted faces in the 2D image 1920. The electronic device 101 may sequentially generate 3D avatars for the first external object 1911, the second external object 1912, and the third external object 1913 corresponding to faces. The electronic device 101 may use one or more 3D avatars to generate a plurality of 3D avatars corresponding to a plurality of external objects. The electronic device 101 may provide one or more 3D avatars through the display device 160 in order to select a 3D avatar corresponding to an external object and determine that the 3D avatar selected according to user input corresponds to the external object. In response to a selection of a first external object 1931 by a user input received through the input device 150 among the plurality of external objects, the electronic device 101 may display an identifier (for example, a circle) indicating the selected first external object 1931 in a 2D image 1930. The electronic device 101 may display one or more 3D avatars 1935 which may correspond to the selected first external object 1931. The one or more 3D avatars 1935 may include an animal 3D set 19341 related to animals and a woman set 19352 related to heroines according to a category. One category may include expression attribute sets of characters associated with each other and the expression attribute set for each character may include an expression attribute subset (for example, an expression attribute set (eyes)) corresponding to a condition for each of elements of the character (for example, a body, eyes, a nose, a mouth, hands, or feet).

The electronic device 101 may select a first 3D avatar 1942 corresponding to a first external object 1941 from one or more 3D avatars and display the selected first 3D avatar 1942 in a 2D image 1940. The electronic device 101 may generate first 3D avatars reflecting facial expressions corresponding to one or more conditions of the face and the body gesture based on one or more of the attributes related to the face and the body gesture of the first external object 1911.

Referring to FIG. 20, one or more 3D avatars 1920 may include predetermined expression attributes related to facial expression according to predetermined circumstances. The electronic device 101 may define one or more circumstances and define expression attributes related to facial expressions of the 3D avatar according to circumstances. The expression attributes of the 3D avatar may include a shape and a motion of eyes, a nose, or a mouth corresponding to the face and also include a shape and a motion of a head, ears, arms, legs, or a belly corresponding to elements other than the face. For example, the electronic device 101 may define a general circumstance 2011 and define expression attributes 2021 and 2031 for one or more avatars.

Referring to FIG. 19B, the electronic device 101 may reflect smiling attributes according to a smile of the first external object 1941 to generate a first 3D avatar. In order to generate 3D avatars corresponding to other external objects in accordance with a selection of a first 3D avatar 1952 corresponding to the first external object 1951 in the 2D image 1950, the electronic device 101 may recommend 3D avatars 1955 belonging to the same category as the first 3D avatar 1952. For example, when the first 3D avatar 1952 belongs to a category related to an animal, the electronic device 101 may display the 3D avatars 1955, which include an animal 3D set.

The electronic device 101 may select a second 3D avatar 1962 corresponding to a second external object 1961 selected in the 2D image 1960 and sequentially select a third 3D avatar 1972 corresponding to a third external object 1971 selected in the 2D image 1970. The electronic device 101 may generate an image 1980 including 3D avatars 1981, 1982, and 1983 generated by applying facial expression attributes selected based on the attributes related to faces of a plurality of external objects to a plurality of 3D avatars 1952, 1962, and 1972 selected in accordance with the plurality of external objects 1951, 1961, and 1971.

According to various embodiments, when there are a plurality of external objects, the electronic device 101 may determine the 3D avatars 1955 recommended and displayed for other selected external objects according to the facial expression attributes of the selected external object and the selected avatar category. For example, when a first person is smiling and a second person is crying and when an external object corresponding to a third person is selected, expression characteristics of the recommended 3D avatars 1955 may include a 3D avatar corresponding to the smile or the crying among characters belonging to the same category.

FIGS. 21A, 21B, 21C, 21D, and 21E illustrate an operation in which an electronic device shares a 3D avatar with an electronic device of a video call counterpart according to various embodiments of the disclosure.

FIGS. 21A, 21B, 21C, 21D, and 21E, the electronic device 101 may provide a video call function and generate a 3D avatar in accordance with an external object corresponding to a face among external objects displayed on a video call screen. The electronic device 101 may share the 3D avatar with a counterpart's electronic device making the video call.

Figures 21A, 21B, 21C:
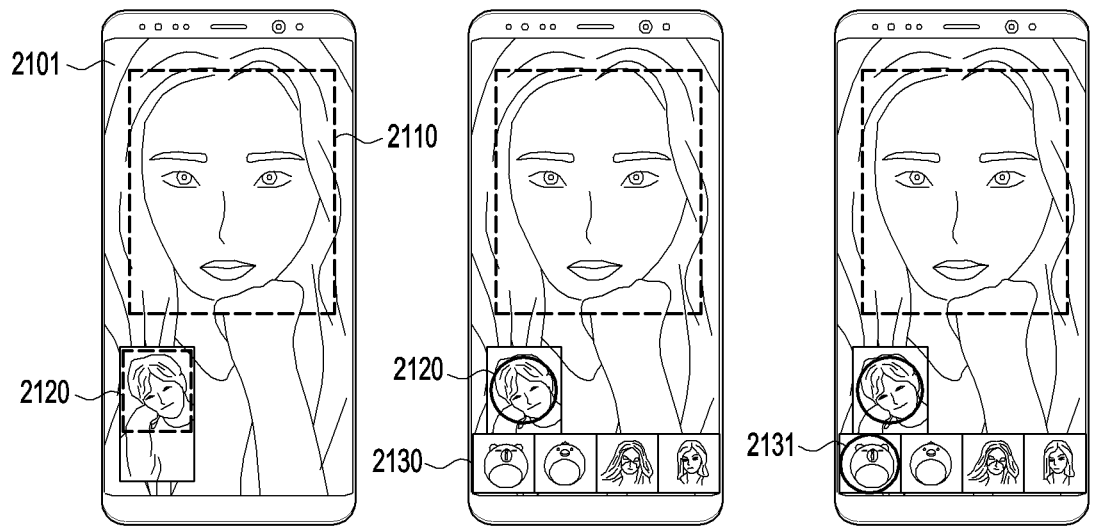
FIGS. 21A, 21B, 21C, 21D, and 21E illustrate an operation in which an electronic device generates a 3D avatar in a video call function according to various embodiments of the disclosure.

Referring to FIG. 21A, the electronic device 101 may execute a video call function, and when the video call is connected, may display a video call screen 2101. The electronic device 101 may extract one or more external objects 2110 and 2120 from the displayed video call screen 2101 and determine whether the extracted external objects correspond to faces. The electronic device 101 may sequentially generate 3D avatars corresponding to the first external object 2110 and the second external object 2120.

Referring to FIG. 21B, the electronic device 101 may display one or more 3D avatars 2130 in response to a selection of the second external object 2120.

Referring to FIG. 21C, the electronic device 101 may determine that a first 3D avatar 2131 selected according to user input corresponds to a second external object 2120.

Figures 21D, 21E:
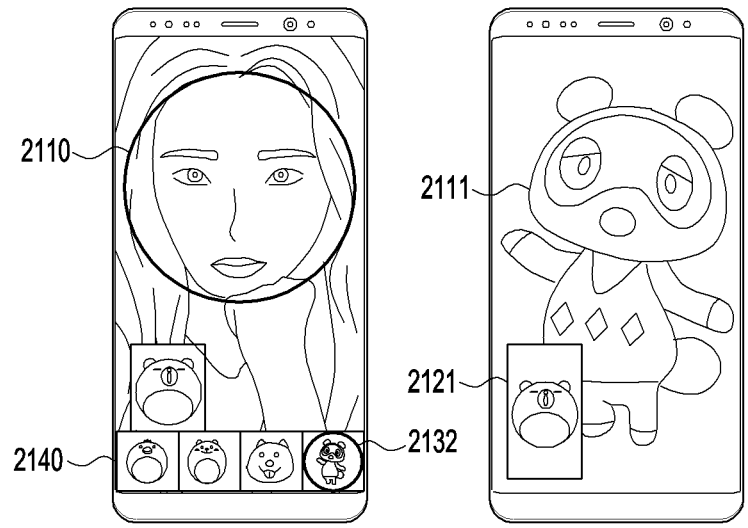

Referring to FIG. 21D, in response to a selection of the first external object 2110, the electronic device 101 may display one or more 3D avatars 2140 selected based on the first 3D avatar.

The electronic device 101 may determine that a second 3D avatar 2132 selected from one or more 3D avatars 2140 corresponds to the first external object 2110. According to an embodiment, in response to a selection of the first external object 2110, the electronic device 101 may transmit one or more 3D avatars 2140 selected based on the first 3D avatar to the counterpart's electronic device. The counterpart's electronic device may perform an operation of receiving the one or more 3D avatars 2140 selected based on the first 3D avatar from the electronic device 101, displaying the 3D avatars 2140 in a video call screen 2210, and selecting one avatar (for example, the second 3D avatar 2132) therefrom. The electronic device 101 may receive a signal corresponding to the second 3D avatar 2132 selected by the counterpart's electronic device.

According to an embodiment, based on the category or facial expression attributes of the first 3D avatar 2131 selected in accordance with the selected second external object 2120, the electronic device 101 may determine and display 3D avatars 2130 in the same category or facial attributes in accordance with the first external object 2110 selected thereafter.

Referring to FIG. 21E, the electronic device 101 may display and provide 3D avatars 2111 and 2121 corresponding to external objects on the video call screen.

Figure 22:
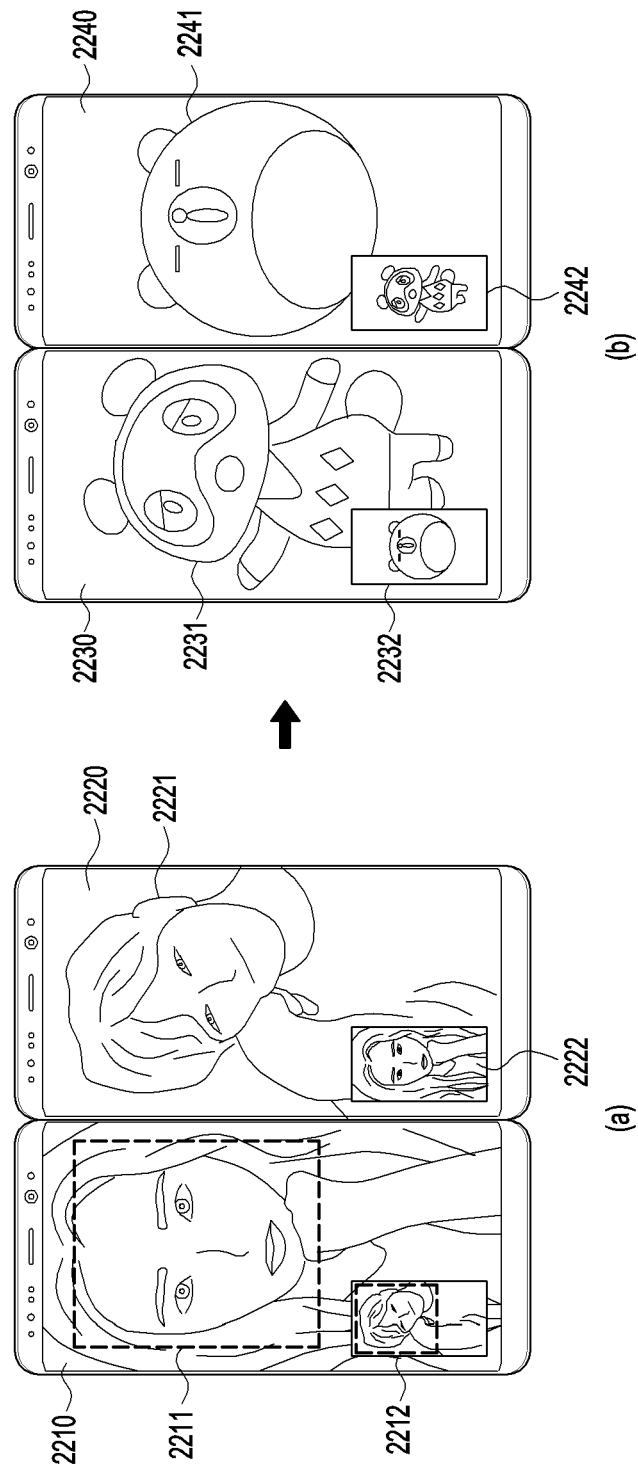
FIG. 22 illustrates an operation in which an electronic device shares a 3D avatar with an electronic device of a video call counterpart according to various embodiments of the disclosure.

FIG. 22 illustrates an operation in which an electronic device shares a 3D avatar with an electronic device of a video call counterpart according to various embodiments of the disclosure.

Referring to FIG. 22, when the electronic device 101 makes a video call with a counterpart's electronic device, the electronic device 101 may display an external object 2211 corresponding to a user and an external object 2212 corresponding to a counterpart on a video call screen 2210 of the electronic device 101 and display an external object 2221 corresponding to the counterpart and an external object 2222 corresponding to the user on a video call screen 2220 of the counterpart's electronic device. At this time, the counterpart's electronic device may also perform an operation of selecting an external object or displaying and selecting 3D avatars corresponding thereto. The electronic device 101 may transmit an indicator displayed therefor and 3D avatars to the counterpart's electronic device.

Referring to FIG. 22, the electronic device 101 may generate 3D avatars corresponding to the external object 2211 corresponding to the user and the external object 2212 corresponding to the counterpart. The electronic device 101 may display generated 3D avatars 2231 and 2232 on a video call screen 2230 and transmit the 3D avatars 2231 and 2231 to the counterpart's electronic device. The counterpart's electronic device may display received 3D avatars 2241 and 2242 on a video call screen 2240. An electronic device (for example, the electronic device 101 of FIG. 1) according to various embodiments may include a camera (for example, the camera module 180 of FIG. 1); a display (for example, the display device 160 of FIG. 1); and a processor (for example, the processor 120 of FIG. 1), wherein the processor 120 may obtain a first image for one or more external objects through the camera module 180, provide a 3D graphic object generated based on attributes related to an external object corresponding to a face among the one or more external objects included in the first image through the display device 160, generate a 3D avatar for the external object at least based on at least one graphic attribute selected from a plurality of graphic attributes which can be applied to the 3D graphic object and the 3D graphic object, and generate a second image including at least one object reflecting a predetermined facial expression or motion using the 3D avatar. According to an embodiment, the processor 120 may determine a 3D template including at least one attribute corresponding to the external object, extract attributes related to the external object from the first image, and generate a 3D graphic object by applying the extracted attributes to the at least one attribute corresponding to the 3D template. According to an embodiment, the processor 120 may extract at least one element of the face from the first image and identify a shape of each element, a color, the relative position between the elements, the relative size ratio between the elements, or an attribute value of an accessory of each element. According to an embodiment, with respect to the attributes of the 3D template irrelevant to the extracted attributes, the processor 120 may generate the 3D graphic object by applying predetermined attributes to the 3D template. According to an embodiment, the processor 120 may determine a 3D template different from the external object corresponding to the face. According to an embodiment, the object may be determined in accordance with a facial expression of the avatar, a gesture of the avatar, a background, or an animation effect, and the processor 120 may generate at least one object reflecting a predetermined value of at least one of the facial expression of the avatar, the gesture of the avatar, the background, and the animation effect using the 3D avatar. According to an embodiment, with respect to a first external object among the one or more external objects, the processor 120 may make at least one configuration corresponding to the face correspond to a configuration of the first external object. According to an embodiment, the processor 120 may generate graphic attributes, based on a first external object which satisfies a predetermined condition among the one or more external objects. According to an embodiment, the processor 120 may determine a 3D template corresponding to the first external object or a predetermined 3D template according to a user input and apply attributes of the first external object to the determined 3D template to generate the graphic attributes. According to an embodiment, the processor 120 may select an additional object which does not correspond to the face from among the one or more external objects and add the selected additional object to generate the 3D avatar. According to an embodiment, the processor 120 may transmit the generated second image to an external electronic device. According to an embodiment, the first image may be a 2D image and the second image may be a 2D still image or a 2D moving image.

An electronic device (for example, the electronic device 101 of FIG. 1) according to various embodiments may include a camera (for example, the camera module 180 of FIG. 1); and a processor (for example, the processor 120 of FIG. 1), wherein the processor 120 may obtain a first image for one or more external objects through the camera module 180, select a 3D avatar corresponding to an external object among one or more 3D avatar, based on the external object corresponding to a face among the one or more external objects included in the first image, and generate a second image including an object generated using the 3D avatar reflecting a facial expression corresponding to the face of the external object. According to an embodiment, the electronic device may further include a communication module (for example, the communication module 190 of FIG. 1) and the processor 120 may receive the one or more 3D avatars through the communication module 190. According to an embodiment, the processor 120 may reflect, in the 3D avatar, a first expression attribute selected based on the facial expression corresponding to the face of the external object among expression attributes related to facial expressions of a predetermined face corresponding to one or more circumstances. According to an embodiment, the expression attributes related to the facial expressions of the predetermined face corresponding to the one or more circumstances may be defined in accordance with eyes, a nose, or a mouth. According to an embodiment, the object may include a facial expression of an avatar, a gesture of an avatar, a background, or an animation effect.

An electronic device (for example, the electronic device 101 of FIG. 1) according to various embodiments may include a camera (for example, the camera module 180 of FIG. 1); and a processor (for example, the processor 120 of FIG. 1), wherein the processor 120 may be configured to obtain a first image for one or more external objects through the camera module 180, identify whether there is an external object corresponding to a face in the one or more external objects included in the first image, generate a 3D avatar, based on attributes related to the external object when there is the external object corresponding to the face, and block generating of a 3D avatar when there is no external object corresponding to the face. According to an embodiment, the electronic device may further include a display (for example, the display device 160 of FIG. 1) and the processor 120 may provide information on whether there is the external object corresponding to the face in the one or more external objects through the display device 160.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device, comprising:
at least one camera;
a touchscreen display;
at least one processor; and
memory storing instructions, wherein the instructions, when executed by the at least one processor, cause the electronic device to:
obtain, via the at least one camera, at least one image with respect to a user,
based on the obtaining of the at least one image, display a first three-dimensional (3D) graphic object by applying attribute pre-designated to a 3D template stored in the memory,
based on the first 3D graphic object, generate and display a 3D avatar including a first animation effect on the touchscreen display, wherein the first animation effect is based on a movement of each part of a face of the user, wherein the movement of each part of the face of the user is identified based on the at least one image with respect to the face of the user being obtained in real time, and wherein the first animation effect is applicable to another 3D graphic object generated by applying the attribute pre-designated to the 3D template,
detect a change of the each part of the face of the user based on the at least one image, change the 3D avatar, including a second animation effect different from the first animation effect, based on the change of the each part of the face of the user in real time, based on reception of a first input to transmit the changed 3D avatar including the second animation effect, display a preview with respect to the changed 3D avatar on an execution screen of a message application, and based on reception of a second input to an send icon included in the execution screen of the message application, transmit the changed 3D avatar including the second animation effect to counterpart device.

2. The electronic device of claim 1, wherein a format of the 3D avatar is graphic interchange format (GIF).

3. The electronic device of claim 1,
wherein the 3D avatar is capable of being transmitted using a plurality of applications, and
wherein the plurality of applications include a message application, a social networking service (SNS) application, and an e-mail application.

4. The electronic device of claim 1, wherein the instructions, when executed by the at least one processor, cause the electronic device to:
identify a facial expression of the user based on at least one image obtained via at least one camera.

5. The electronic device of claim 1, wherein the instructions, when executed by the at least one processor, cause the electronic device to:
based on at least one graphic attribute from among a plurality of graphic attributes, generate a plurality of 3D templates for generating the 3D avatar.

6. A non-transitory storage medium storing one or more programs, the one or more programs comprising computer-executable instructions configured to, when executed by at least one processor of an electronic device, cause the electronic device to:
obtain, via at least one camera of the electronic device, at least one image with respect to a user;
based on the obtaining of the at least one image, display a first three-dimensional (3D) graphic object by applying attribute pre-designated to a 3D template stored in memory of the electronic device;
based on the first 3D graphic object, generate and display a 3D avatar including a first animation effect on a touchscreen display of the electronic device, wherein the first animation effect is based on a movement of each part of a face of the user, wherein the movement of each part of the face of the user is identified based on the at least one image with respect to the face of the user being obtained in real time, and wherein the first animation effect is applicable to another 3D graphic object generated by applying the attribute pre-designated to the 3D template;
detect a change of the each part of the face of the user based on the at least one image, change the 3D avatar, including a second animation effect different from the first animation effect, based on the change of the each part of the face of the user in real time;
based on reception of a first input to transmit the changed 3D avatar including the second animation effect, display a preview with respect to the changed 3D avatar on an execution screen of a message application; and
based on reception of a second input to a send icon included in the execution screen of the message application, transmit the changed 3D avatar including the second animation effect to counterpart device.

7. The non-transitory storage medium of claim 6, wherein a format of the 3D avatar is graphic interchange format (GIF).

8. The non-transitory storage medium of claim 6,
wherein the 3D avatar is capable of being transmitted using a plurality of applications, and
wherein the plurality of applications include a message application, a social networking service (SNS) application, and an e-mail application.

9. The non-transitory storage medium of claim 6, wherein the instructions, when executed by the at least one processor, cause the electronic device to:
identify a facial expression of the user based on at least one image obtained via at least one camera.

10. The non-transitory storage medium of claim 6, wherein the instructions, when executed by the at least one processor, cause the electronic device to:
based on at least one graphic attribute from among a plurality of graphic attributes, generate a plurality of 3D templates for generating the 3D avatar.

* * * * *